(12) United States Patent
Ten-Jet-Foei et al.

(10) Patent No.: US 12,187,106 B2
(45) Date of Patent: Jan. 7, 2025

(54) OPEN ROOF CONSTRUCTION FOR A VEHICLE

(71) Applicant: Inalfa Roof Systems Group B.V., Oostrum (NL)

(72) Inventors: Suyanto Teri Wahiyu Ten-Jet-Foei, Helmond (NL); Thomas Anton Martijnszoon Albers, Venray (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 276 days.

(21) Appl. No.: 17/591,372

(22) Filed: Feb. 2, 2022

(65) Prior Publication Data

US 2022/0242206 A1 Aug. 4, 2022

(30) Foreign Application Priority Data

Feb. 4, 2021 (EP) .................................... 21155206

(51) Int. Cl.
*B60J 7/08* (2006.01)
*B60J 7/02* (2006.01)
*B60J 7/043* (2006.01)
*B60J 7/053* (2006.01)
*B60J 7/057* (2006.01)

(52) U.S. Cl.
CPC ............. *B60J 7/024* (2013.01); *B60J 7/0435* (2013.01); *B60J 7/053* (2013.01); *B60J 7/057* (2013.01)

(58) Field of Classification Search
CPC . B60J 7/024; B60J 7/0435; B60J 7/054; B60J 7/057; B60J 7/0573; B60J 7/1642; B60J 7/1657

USPC ................................ 296/216.02, 3, 221–223
See application file for complete search history.

(56) References Cited

FOREIGN PATENT DOCUMENTS

| DE | 102018124336 A1 | 4/2020 |
|---|---|---|
| EP | 0531881 A2 | 3/1993 |
| JP | S56155928 U | 11/1981 |
| JP | H04254215 A | 9/1992 |
| JP | 2015123805 A | 7/2015 |

OTHER PUBLICATIONS

European Search Report for corresponding European patent application No. 21155206.2 dated Jul. 12, 2021.

*Primary Examiner* — Dennis H Pedder
(74) *Attorney, Agent, or Firm* — Steven M. Koehler; Westman, Champlin & Koehler, P.A.

(57) ABSTRACT

An open roof construction for a vehicle comprises a frame and a panel capable of at least partly opening and closing an opening in a fixed roof. A drive motor in the vicinity of the rear edge of the opening and in the vicinity of a longitudinal center line of the opening comprises elongate drive members extending from its output shaft oppositely along the rear edge. An operating mechanism is movably connected between the frame near the rear edge and the rear edge of the panel. The operating mechanism includes two height-adjusting members on the frame, one on each lateral side of the drive motor and guided for a movement in lateral direction initiated by the drive members. Two height-adjustable members are immovably fixed to the panel and cooperate with the height-adjusting members which move along with the drive members so as to cause the height adjustment.

18 Claims, 24 Drawing Sheets

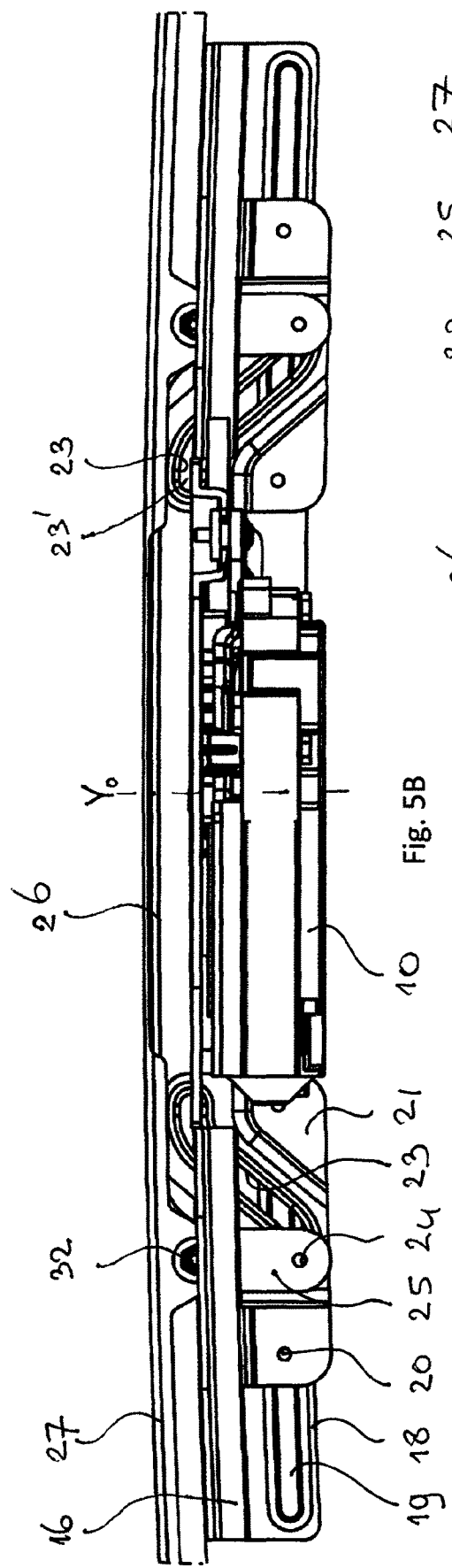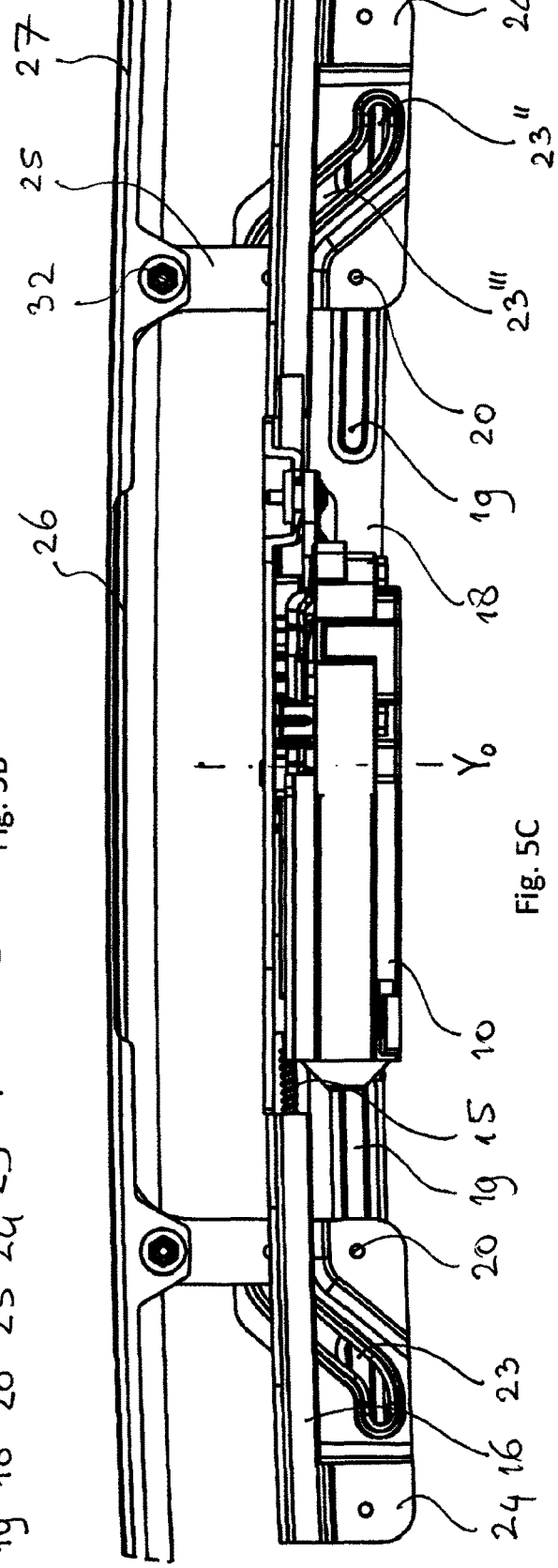

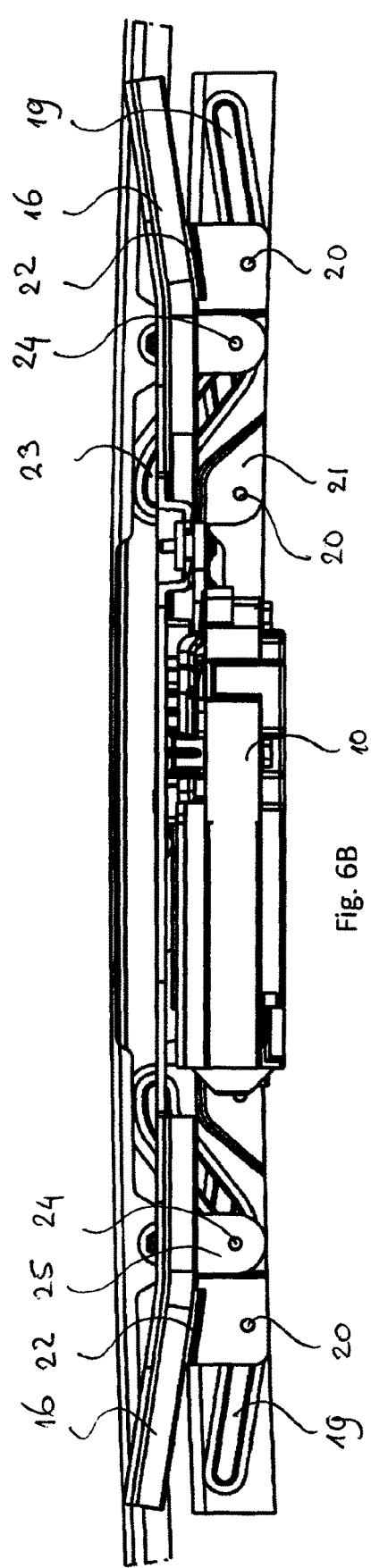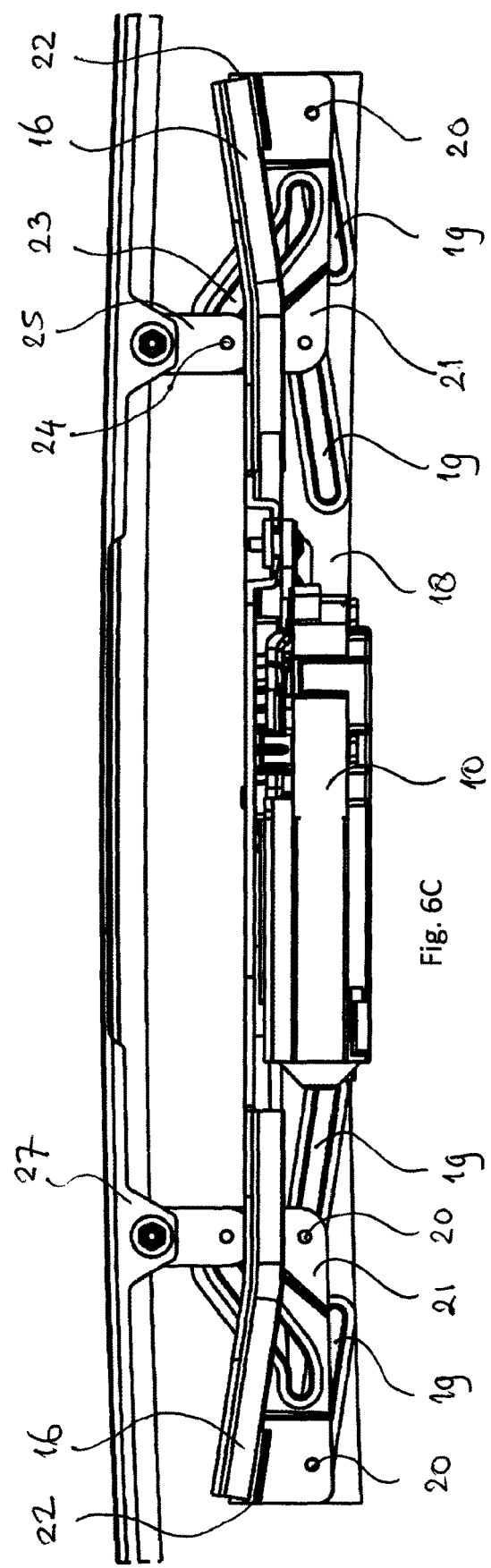

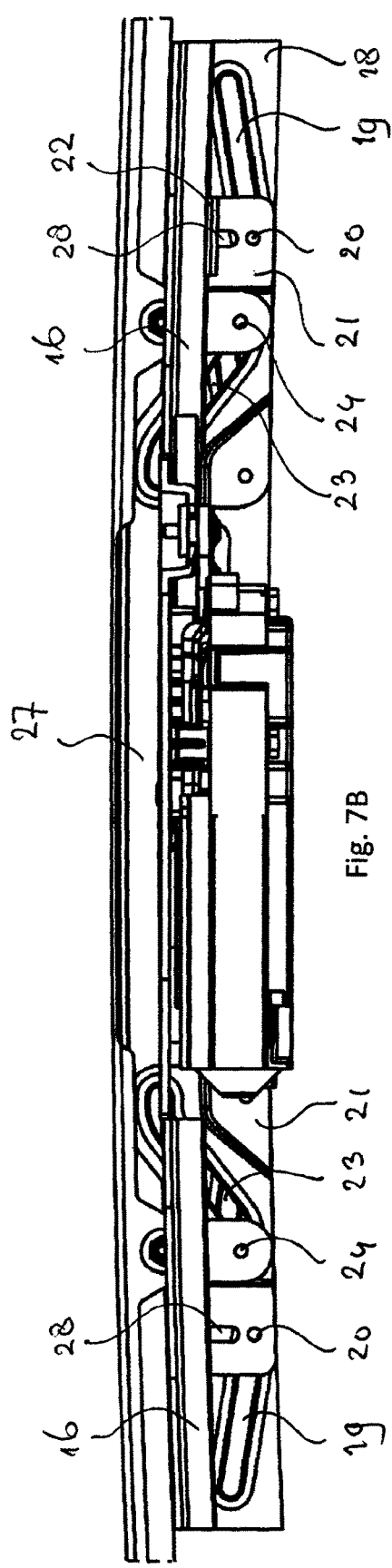
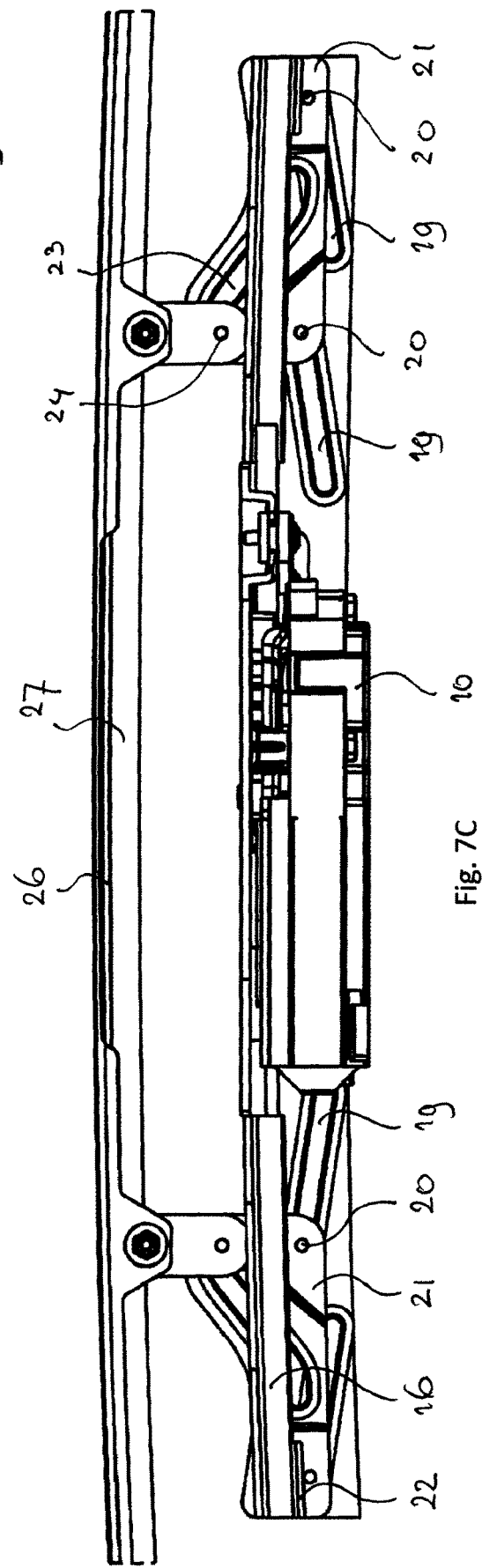
Fig. 7B
Fig. 7C

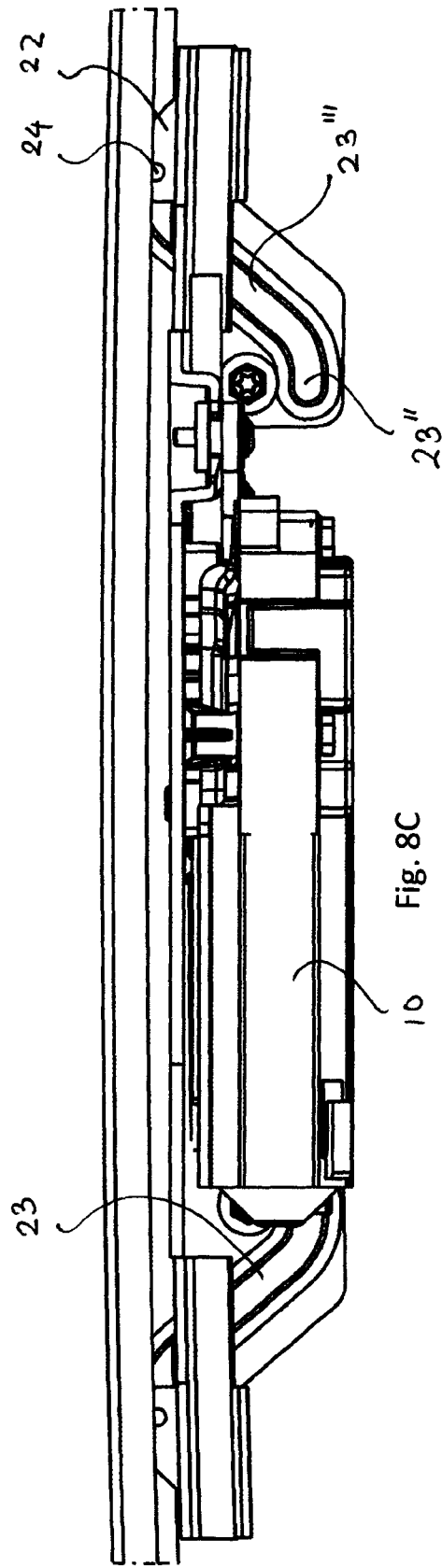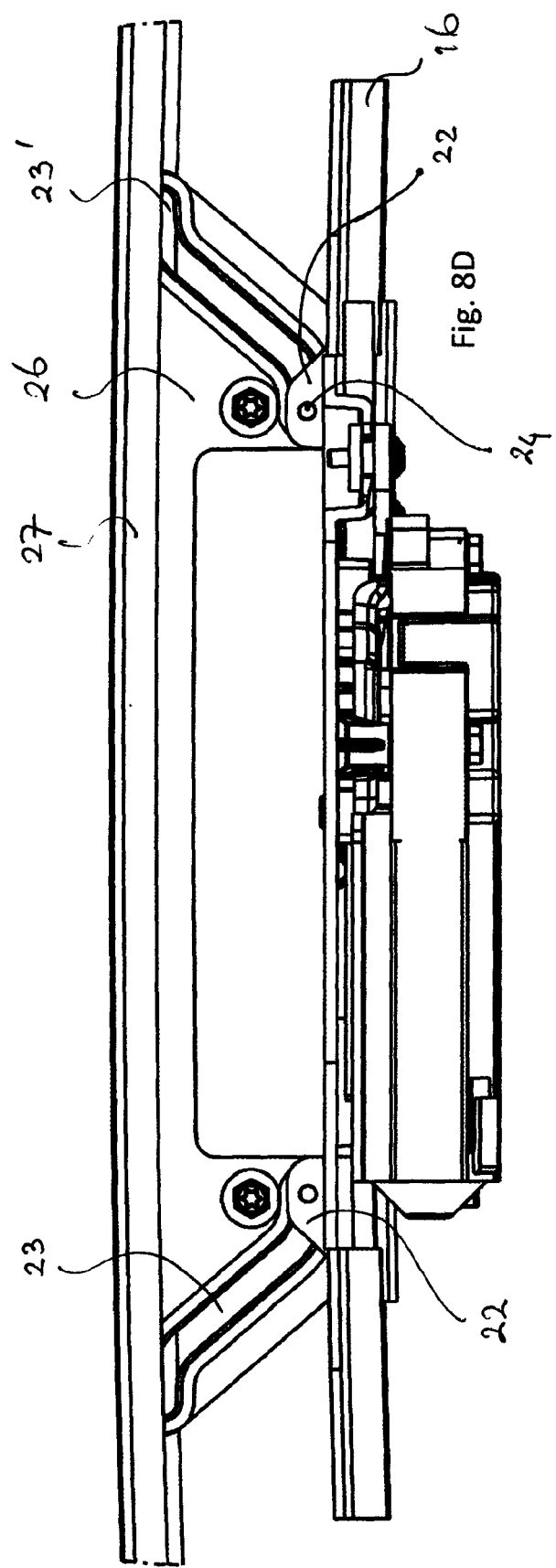

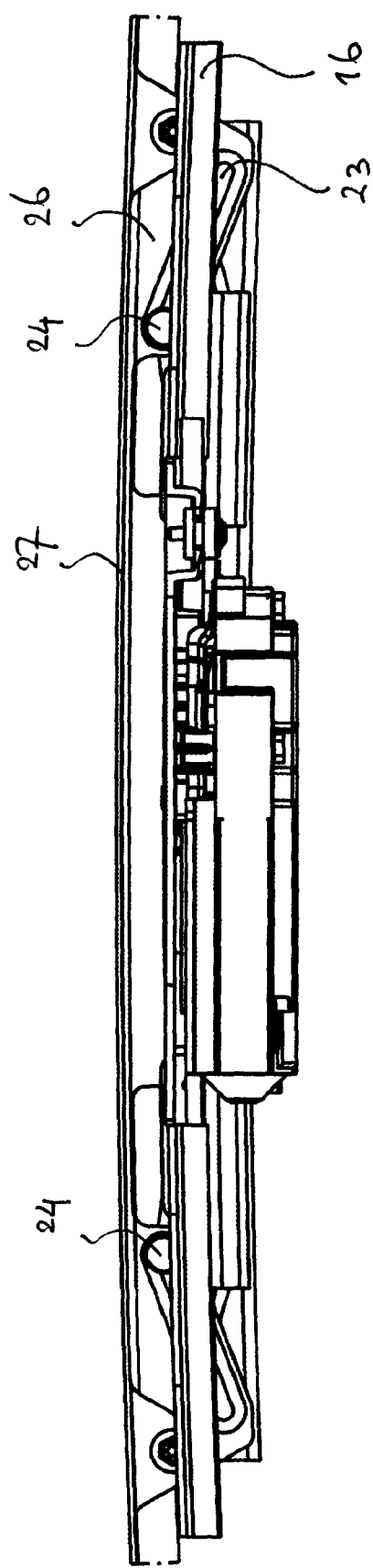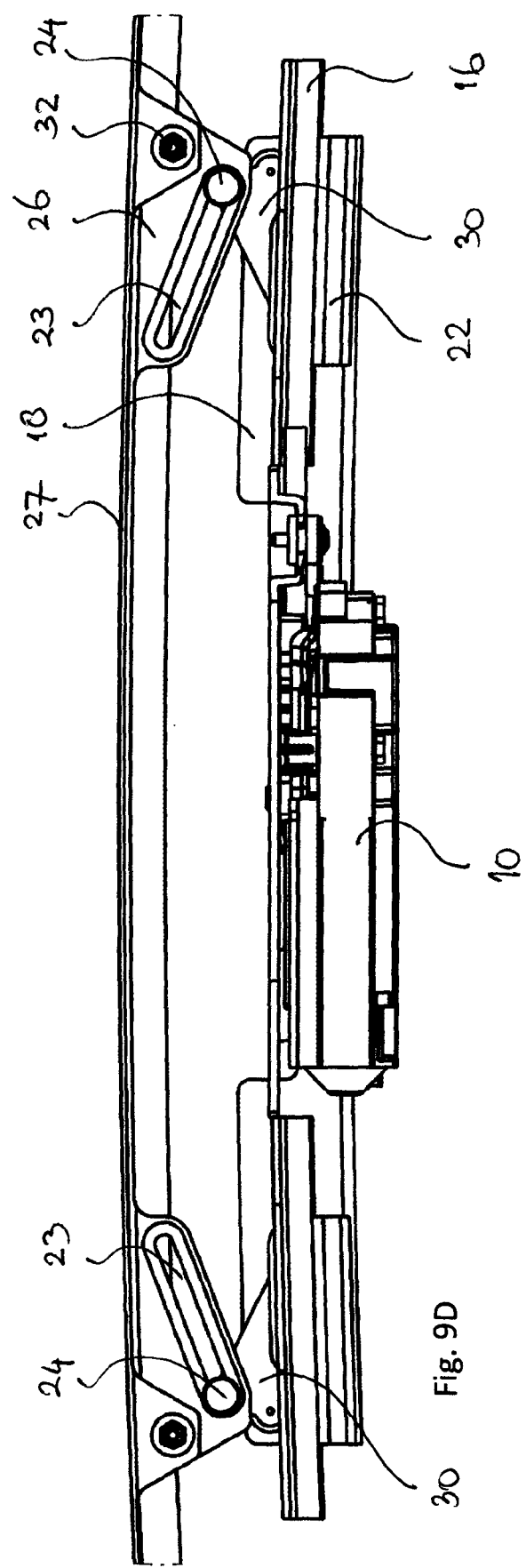
Fig. 9C
Fig. 9D

OPEN ROOF CONSTRUCTION FOR A VEHICLE

BACKGROUND

The discussion below is merely provided for general background information and is not intended to be used as an aid in determining the scope of the claimed subject matter.

The invention relates to an open roof construction for a vehicle having an opening in its fixed roof, comprising a stationary frame fitted in the opening of the fixed roof, at least a panel movably supported by the frame and capable of at least partly opening and closing the opening in the fixed roof by tilting the panel with its rear edge up and down.

In a prior art open roof construction, a so-called popup roof, the panel can only be tilted from its closed position to a venting position and back. The operating mechanism includes a lever structure below each side edge of the panel.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An open roof construction herein disclosed comprises a drive motor placed in the vicinity of the rear edge of the opening in the fixed roof and in the vicinity of a longitudinal center line of the opening, said drive motor being connected to the stationary frame, said drive motor comprising an output shaft and elongate drive members extending from the output shaft oppositely along the rear edge of the opening, an operating mechanism movably connected between the frame near the rear edge of the opening and the rear edge of the panel, the operating mechanism including two height-adjusting members on the frame, one on each lateral side of the drive motor and guided for a movement in a lateral direction initiated by the drive members, and two height-adjustable members immovably fixed to the panel and cooperating with the height-adjusting members on the frame which move along with the drive members so as to cause the height adjustment.

By placing the drive motor and all or most parts of the operating mechanism behind the roof opening, the open roof construction can be built with a low vertical package along the sides of the roof opening where maximum head space is required. The rear of the roof opening is often positioned between front and rear occupants of the vehicle, so that a greater building height there is not deteriorating head space. Due to the fixed height-adjustable members, the support of the panel can be made more stable and less complex. In general the lifting height will be less in comparison with levers when the building height is similar, so that such fixed members are especially suitable for open roof constructions needing a relatively small lifting height.

The height-adjusting members on the frame are preferably connected to the height-adjustable members on the panel at a distance from a respective side edge of the panel, in particular such that the middle of the connection of each height-adjusting member to the height-adjustable member is at a distance from the longitudinal center of the panel ranging from about 10% to about 45% of the local width of the panel.

By using two height-adjustable members instead of one arranged in the center of the panel and by attaching these members at a distance from the edges of the panel instead of at the edges, the stability will be better compared to the other two situations. Furthermore, seal pressure on the seal below the rear edge of the closed panel will be better distributed if the connections will be spaced from the center and sides of the panel.

In one embodiment, the height-adjusting members and the height-adjustable members each include a guide curve and a guide pin engaging the curve, one thereof being fixed to the panel, the other being connected to the frame.

This is a simple but stable manner of obtaining the height adjustability.

When the panel is tiltable around a lateral axis near a front edge of the panel it is favorable if at least a portion of the pin engaging the curve is shaped like a barrel to enable a limited angular rotation between the pin and the curve around said lateral axis.

In a favorable embodiment, the drive motor comprises a substantially vertical output shaft and the elongate drive members being in engagement with a gear wheel on said output shaft.

In one embodiment, the drive members are each a drive cable which are in engagement with the gear wheel on opposite sides thereof, the height-adjustable members and the height-adjusting members are mirror-shaped with respect to each other and the drive cables with the height-adjusting members move in opposite directions.

Such arrangement with the height-adjusting members close to the motor the elongated drive member can be short and with only slight curves. Therefore, the operating mechanism can be driven with a low motor torque and thus only a small drive motor is required, which is generally cheaper and occupies less space.

In another embodiment, the drive members are each an end portion of a single drive cable extending substantially in a straight line in lateral direction of the roof, the height-adjustable members and the height-adjusting members are equally shaped and the height-adjusting members move in the same direction by means of said single drive cable.

This straight single drive cable leads to an even lower resistance in the drive cable and therefore needs even less torque from the drive motor.

The height-adjusting members may be guided to move substantially in a lateral direction only leading to a low resistance in the operating mechanism.

However, it is also possible that the height-adjusting members are guided to move at least partly along an inclined path in lateral and vertical directions.

This leads to a slightly higher resistance in the operating mechanism but also to a higher lift of the panel with the same package height or to a lower package height and the same lifting height.

The height-adjusting members may each be provided with a guide curve and the height-adjustable members with a guide pin, or the height-adjusting members may each be provided with a guide pin and the height-adjustable members with a guide curve.

In a particular embodiment, the height-adjusting members are each provided with a lever which is provided with said guide pin near a free end of the lever, and wherein each lever engages the frame such that it is urged to rotate when it moves with the respective drive member. Preferably, each lever engages the frame at a position near the free end of the lever at a distance substantially below the guide pin.

The operating mechanism is preferably configured such that the panel can only be tilted up and down which leads to a venting function and a low package height as the operating mechanism is concentrated near the center of the open roof construction at the rear thereof, where generally no passenger seats are located.

According to another aspect of the invention, the height-adjusting members on the frame are connected to the height-adjustable members on the panel at a distance from a respective side edge of the panel, in particular such that the middle of the connection of each height-adjusting member to the height-adjustable member is at a distance from the longitudinal center line of the panel ranging from 10%-45% of the local width of the panel.

An aspect of the invention also includes a vehicle comprising the open roof construction as described above.

BRIEF DESCRIPTION OF THE DRAWINGS

Further details and advantages of aspects of the invention follow from the below description with reference to the drawings in which:

FIGS. 5B and 5C are enlarged frontal views of the motor and operating mechanism of FIG. 5A in closed and opened position.

FIGS. 6A-6D and 7A—7D are views similar to those of FIGS. 5A-5D but showing other embodiments.

FIGS. 8C-8E are views corresponding to those of FIGS. 5B-5D but showing the embodiment of FIG. 8A.

FIGS. 9A-9D are views corresponding to those of FIGS. 8A-8D but showing yet another embodiment.

DETAILED DESCRIPTION OF THE ILLUSTRATIVE EMBODIMENTS

In the following embodiments of the open roof construction like reference numbers are used to denote like parts in different embodiments.

Figure 1:
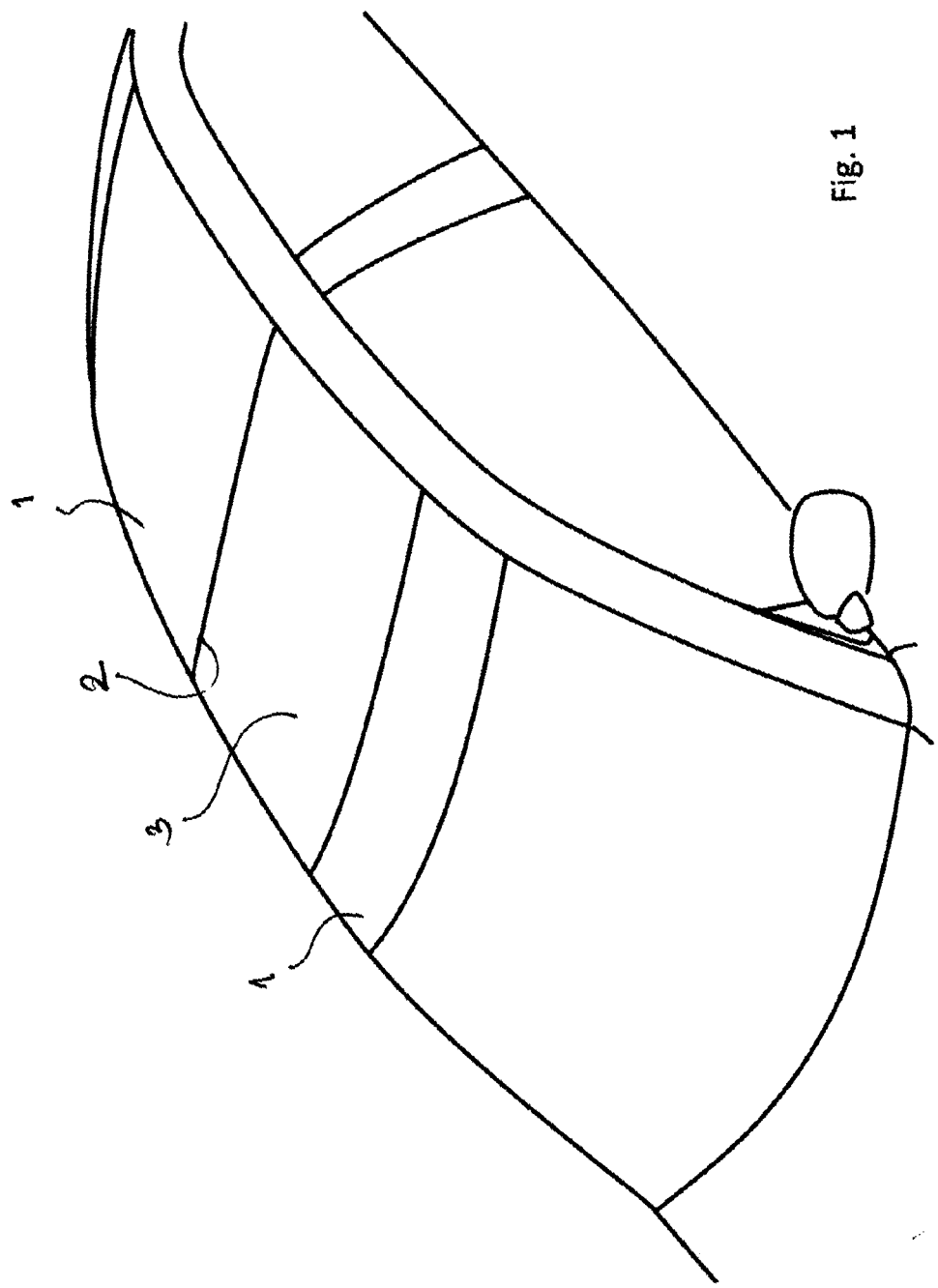
FIG. 1 is a perspective view of a vehicle roof comprising an embodiment of the open roof construction.
Figure 2:
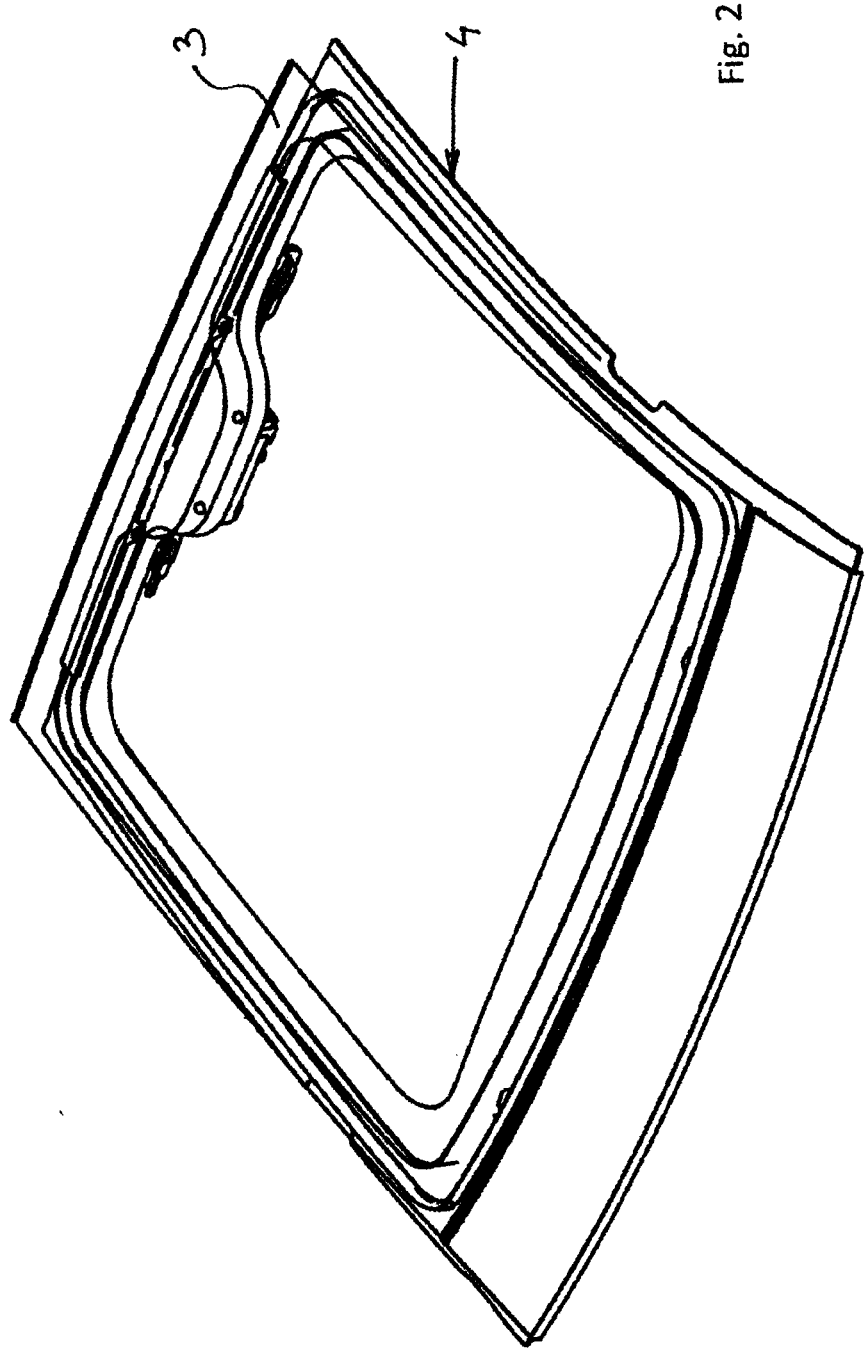
FIG. 2 is a perspective view of the open roof construction separate from the vehicle.

Referring to FIG. 1, there is shown a fixed roof 1 of a vehicle, in this case a passenger car, having an open roof construction positioned in a roof opening 2 in fixed roof 1. This roof opening 2 can be opened and closed by a panel 3 of the open roof construction. This panel 3 is in this case a rigid, at least partly transparent panel, made of glass, plastic, or the like. The open roof construction is of the so-called "pop up" type, which means that an operating mechanism of the open roof construction is capable of lifting the panel 1 at its rear end upwardly to open the panel 1 to a rearwardly and upwardly inclined venting position (see e.g. FIG. 5D) and downwardly again to close the panel 1 in a closed position substantially flush with the fixed roof of the vehicle (cf. FIGS. 1 and 2 and dashed line in FIG. 5D). The openable panel 1 may be a top loaded open roof construction or a bottom loaded roof construction, meaning that the open roof construction may be assembled from the upper (top) side of the fixed roof 1 of the vehicle or the from the lower (bottom) side of the roof. The drawings in this document show a top loaded open roof construction.

Figure 3:
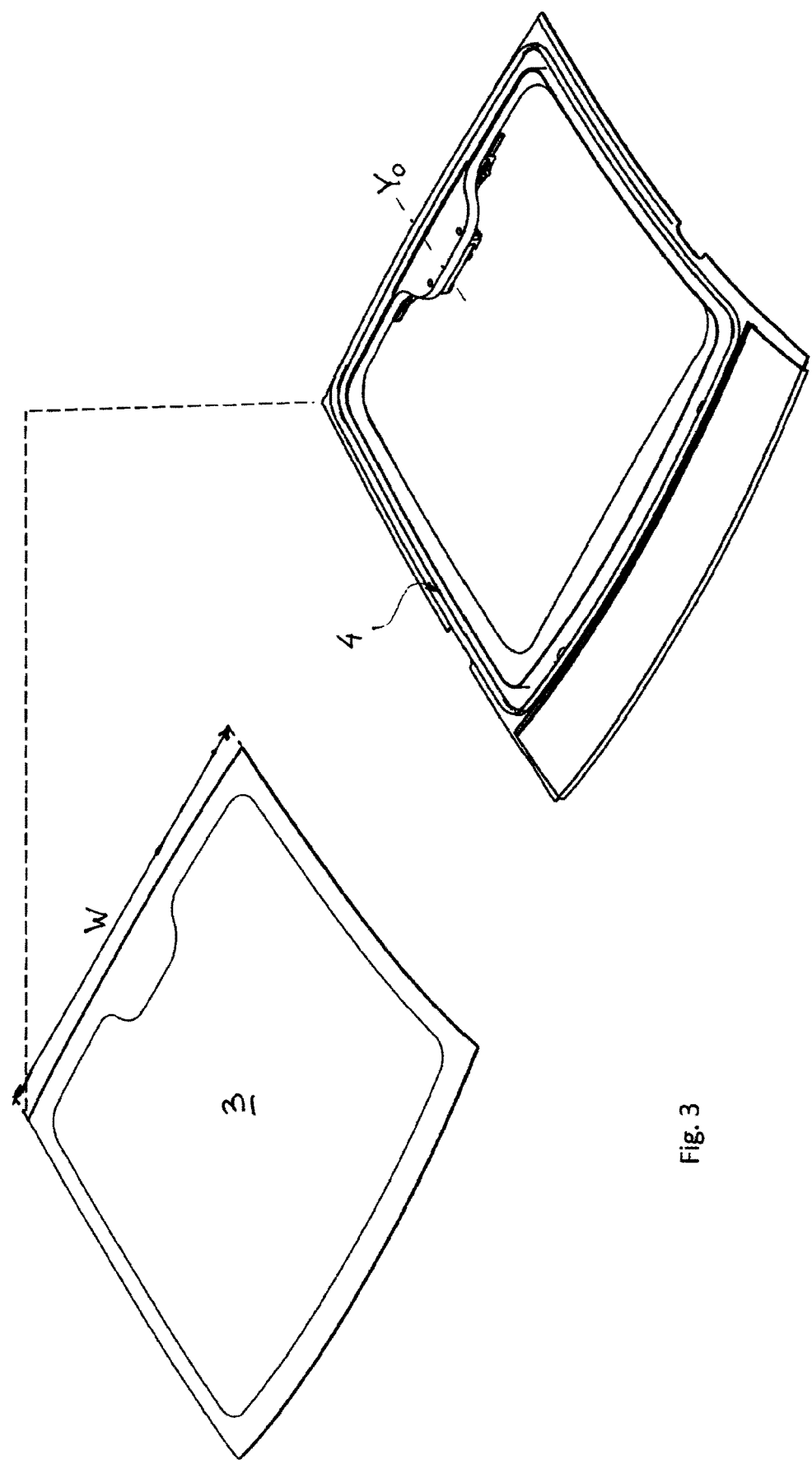
FIG. 3 is a view similar to that of FIG. 3 but showing the panel of the open roof construction separately.

In FIG. 3, the panel 1 is shown separately from the remainder of the open roof construction. This remainder includes a stationary frame 4 with which the open roof construction is attached to the fixed roof 1 of the vehicle. FIG. 5D shows a cross beam 5 and a roof skin of fixed roof 1 forming a flange 6 onto which a rear portion of frame 4 rests with interposition of a seal 7, glue bead or the like (this shows it is a top loaded roof). The frame 4 may be bolted, glued, welded or the like to fixed roof 1. A seal 8 further seals frame 4 to fixed roof 1, and frame 4 to the circumference of panel 3, while a seal 9 seals frame 4 to a lower surface of panel 3, when it is in its closed position, see dashed lines in FIG. 5D.

Figure 4:
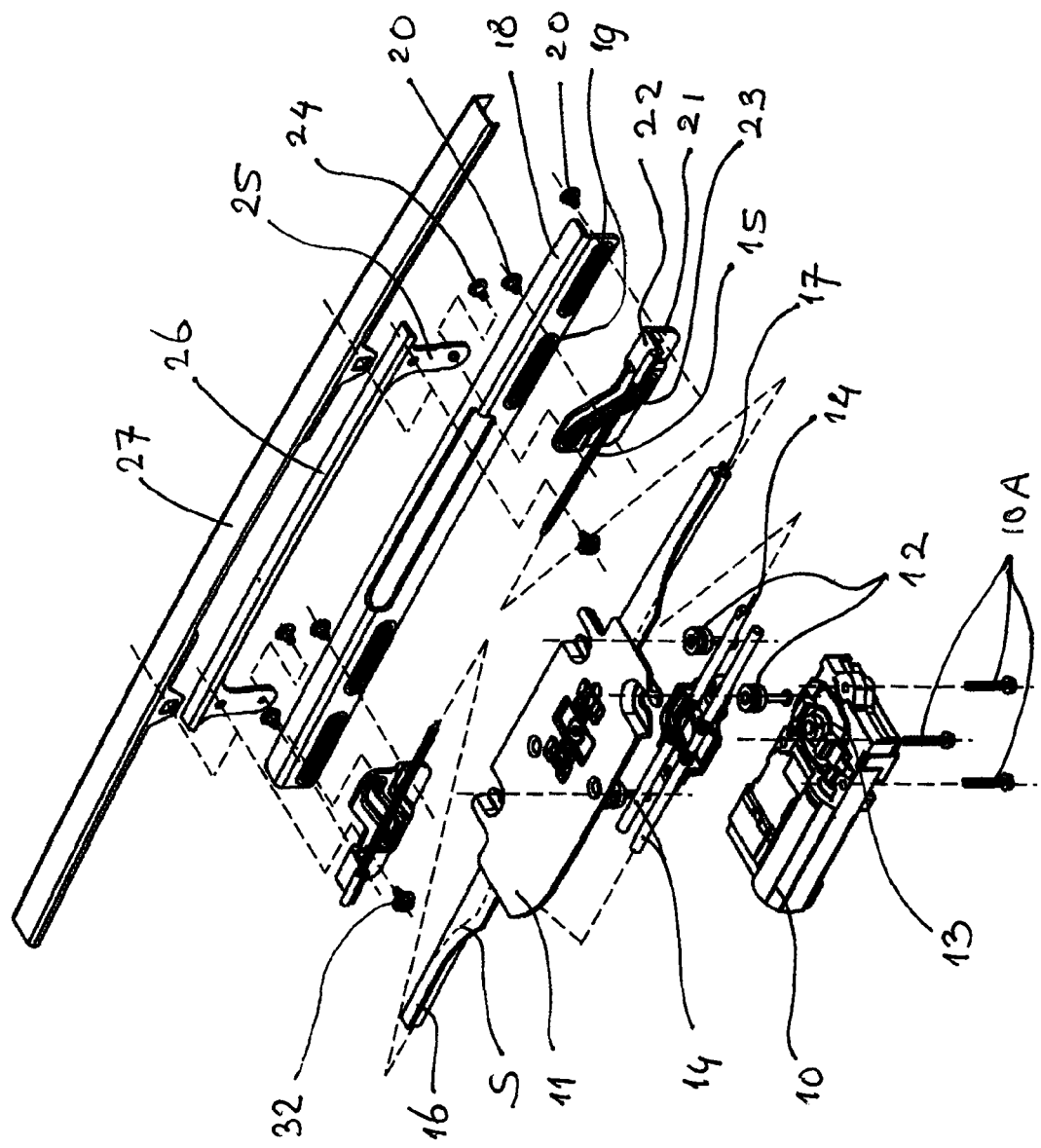
FIG. 4 is an enlarged exploded view of a first embodiment of the electric motor and operating mechanism of the open roof construction of FIGS. 2 and 3, which is used to open and close the panel thereof.

The exploded view of FIG. 4 shows all parts of the operating mechanism, including an electric motor 10 driving it. Dashed lines show the connections between parts.

Motor 10 is fixed by fixing means 10A to a plate-shaped motor support 11 which is attached to frame 4 (not shown here) by fixing means having vibration dampers 12. Motor 10 has an output shaft which is directed substantially vertically when in use and is provided with an output gearwheel 13. Drive cables 15, which carry a toothing on their surface, are in engagement with opposite sides of gearwheel 13 and are kept in engagement by guide tubes 14 clamped between motor 10 and motor support 11. Motor support 11 carries guide rails 16 each having a guide groove 17 communicating with one of the guide tubes 14 and guiding the respective drive cable 15. Because drive cables 15 are in engagement with opposite sides of gear wheel 13 (i.e. at positions on its circumference 180° apart), drive cables 15 move in opposite directions when output shaft and gearwheel 13 of motor 10 rotate. Drive cables 15 are guided in lateral direction of the open roof construction. Because drive cables 15 are offset at the position of gearwheel 13 a portion of one or both drive cables 15 is guided in an S-shape S in order for drive cables 15 to become aligned with each other before entering aligned guide grooves 17 of guide rails 16.

The operating mechanism for panel 3 includes a stationary guide rail 18 on frame 4, which guide rail 18 includes two pairs of guide slots 19 engaged by sliding pins 20 which are attached to a pair of curve slides 21. These curve slides 21 include cable attachments 22 engaging the respective guide groove 17 of guide rail 16 and to which the respective drive cables 15 are attached in order to drive curve slides 21 in opposite directions such that sliding pins 20 slide from one end of respective guide slot 19 to the other.

Curve slides 21 are shaped in mirror image and so are guide curves 23 therein. Each guide curve 23 includes two short horizontal end portions 23', 23" on different heights and an inclined main portion 23''' connecting them. A guide pin 24 engages its respective guide curve 22 and is fixed to a downwardly suspended leg 25 of a common bracket 26. This bracket 26 is attached to a reinforcing member 27 on the lower surface of panel 3. Curve slides 21 with guide curves 23 act as height-adjusting members, whereas guide pins 24 on legs 25 of bracket 26 act as height-adjustable members.

In this embodiment, the connection between the height-adjusting members (curve slide 21 with guide curve 23) and the height-adjustable members (guide pins 24) is at a position between the center $Y_0$ (FIGS. 3 and 5B, 5C) of panel 3 (in the middle between guide pins 24) and the side edge of panel 3, i.e. at a distance from the center and from the side edge. Preferably, this connection (or the center of this connection) is at a distance of 10%-45% of the local width W (see FIG. 3) of panel 3 from the longitudinal center $Y_0$ of panel 3. In practice the width W of panel 3 will be between 800 mm and 1200 mm, while the distance between the (center of the) connection and the center $Y_0$ of panel 3 is between 100 mm and 550 mm.

Figure 5A:
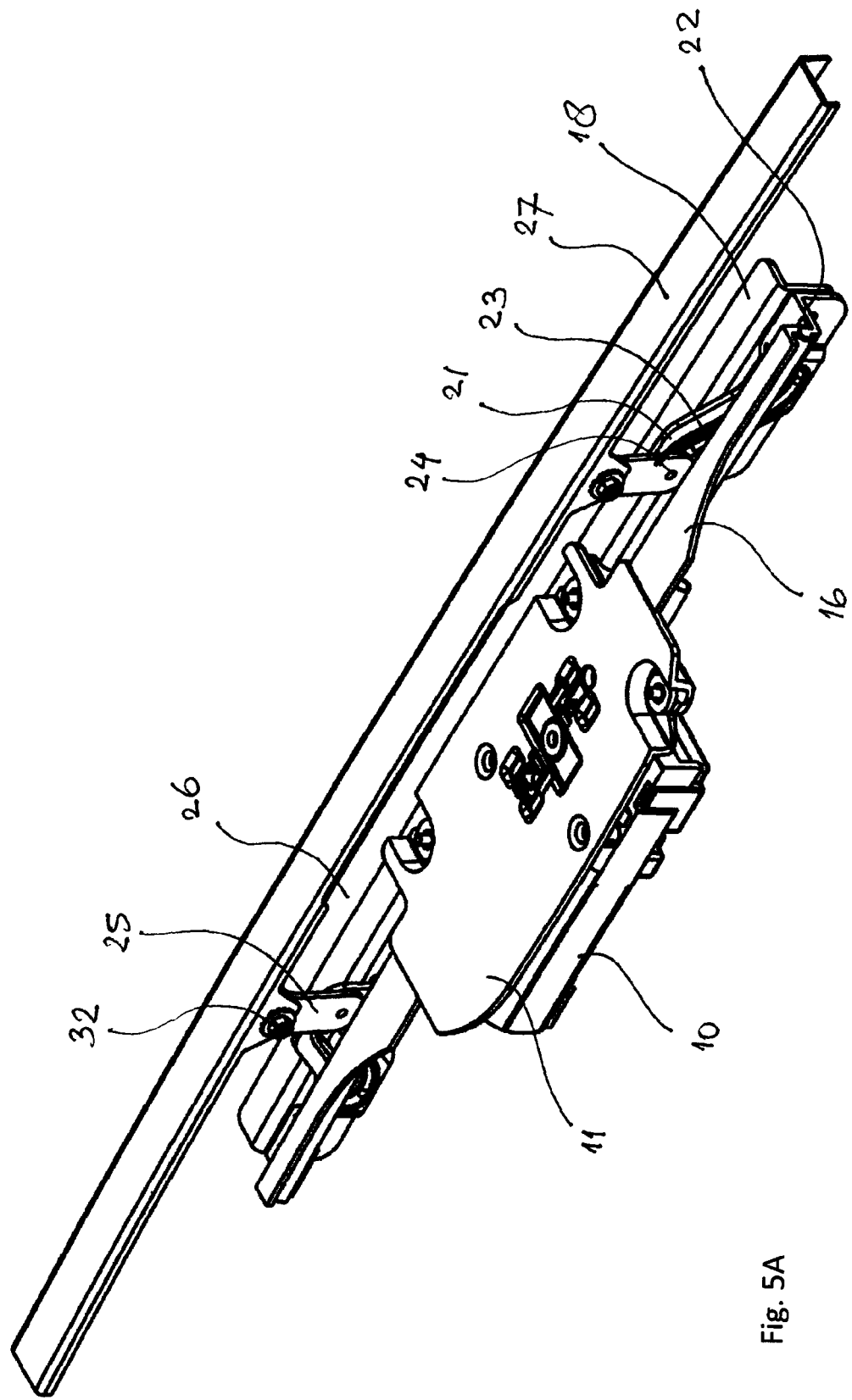
FIG. 5A is a perspective view of the motor and operating mechanism of FIG. 4 in an assembled state.
Figure 5D:
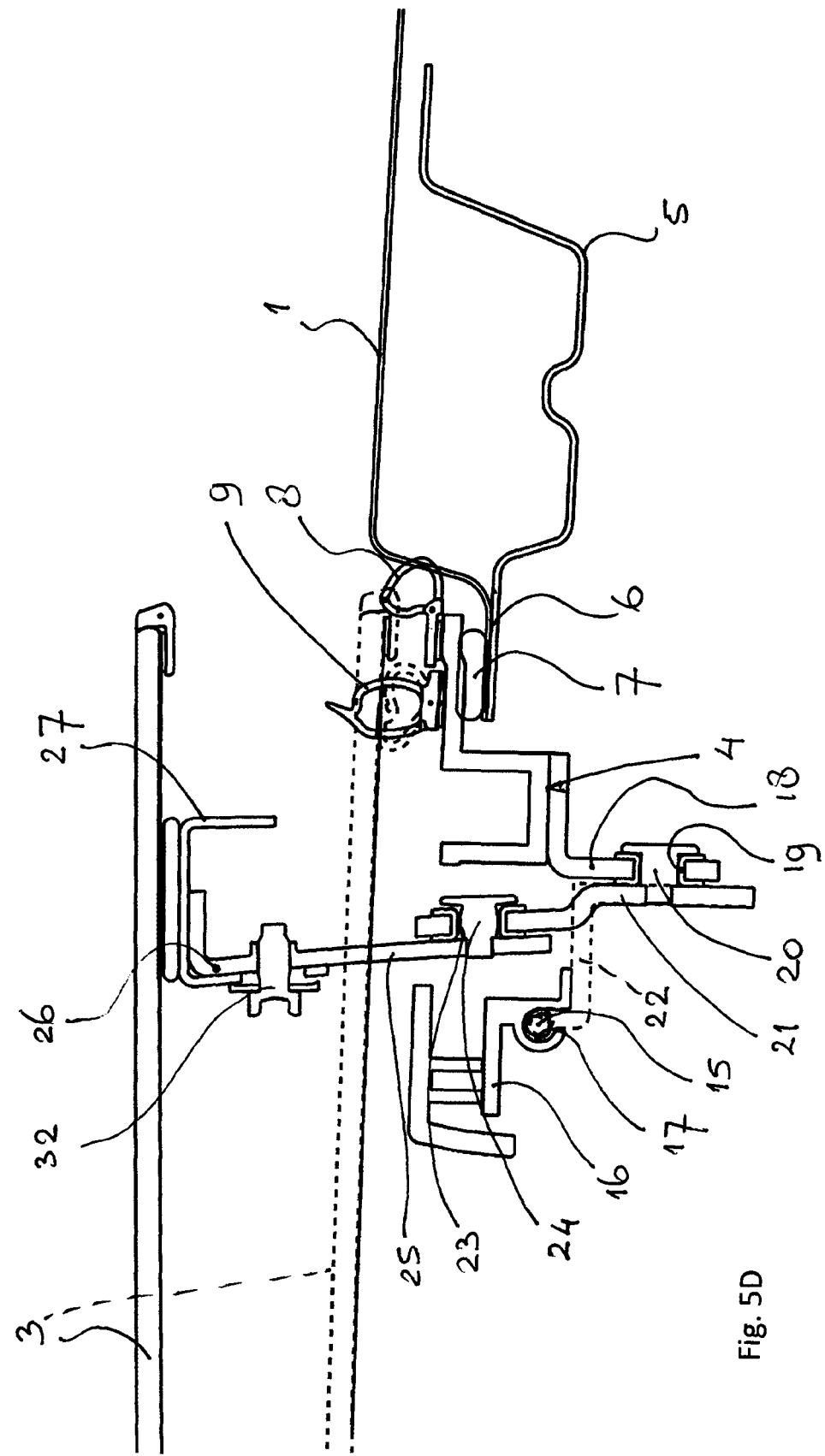
FIG. 5D is a cross-sectional side view of the operating mechanism of FIG. 5C as built into a vehicle.
Figure 6A:
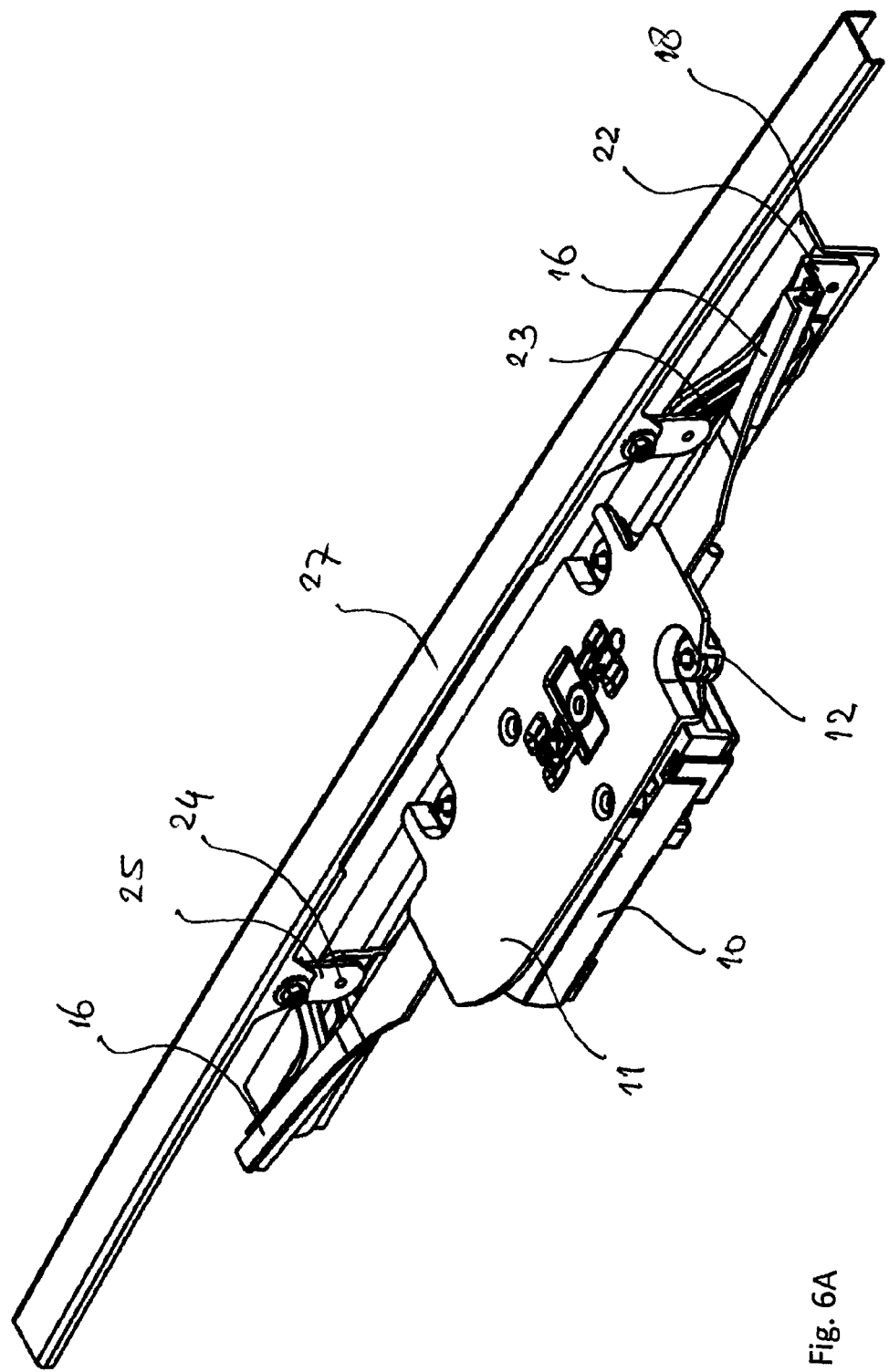
Figure 6D:
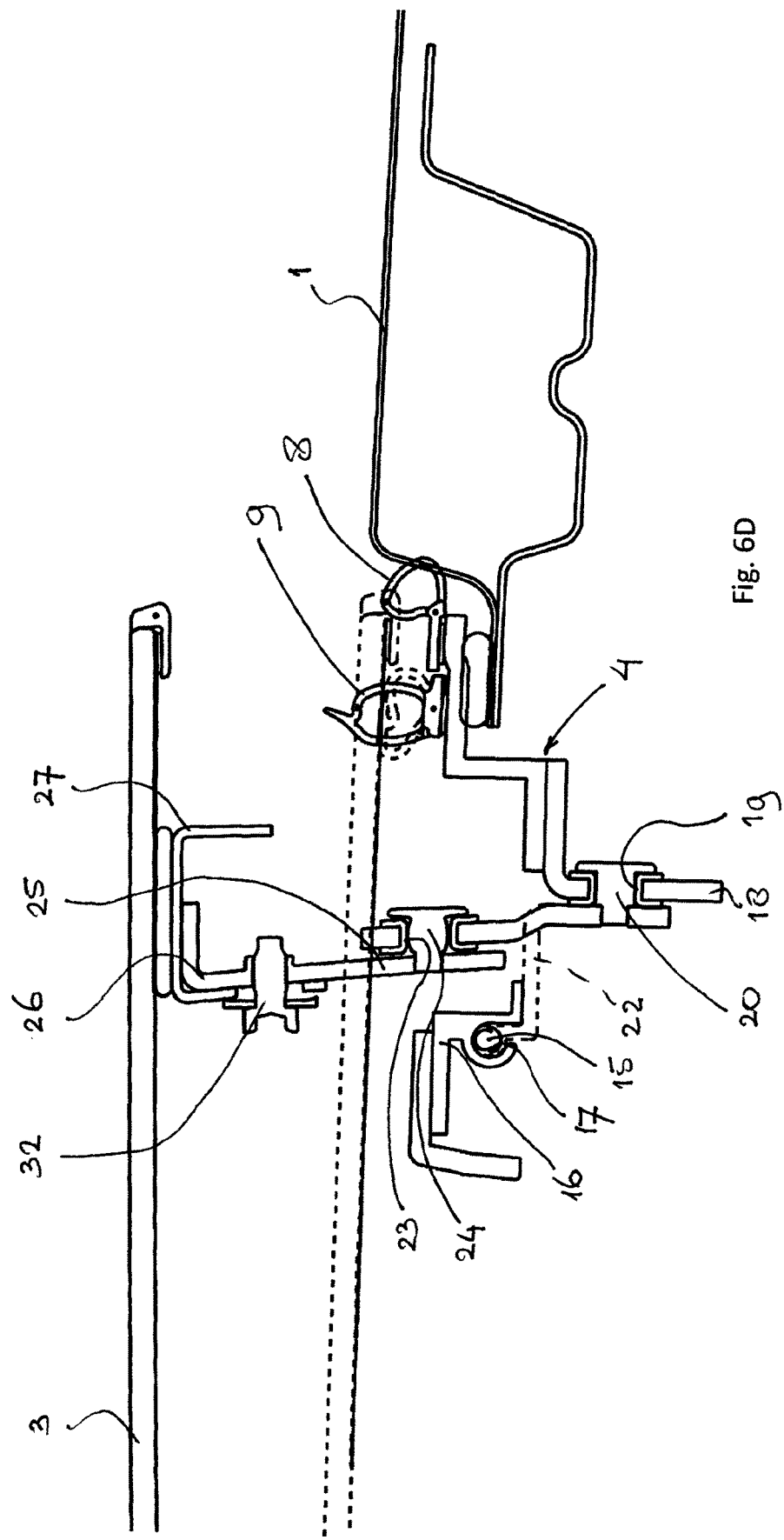

FIGS. 5B and 5C show the two extreme positions of the operating mechanism. In the position of FIG. 5B, drive cables 15 are in retracted position, so that curve slides 21 are closest to the center of panel 3 and therefore closest to drive motor 10. As a result, guide pins 24 are in the lower horizontal curve portion 23' so that panel 3 is in its lower, i.e. closed position.

In FIG. 5C, drive cables 15 with their cable attachments 22 have been moved outwardly away from drive motor 10. As a result, curve slides 21 have been taken along such that their sliding pins 20 have moved to the outer end of their respective guide slots 19. Guide pins 24 are kept by bracket 26 of panel 3 in a laterally stationary position, so that guide pins 24 are forced to slide through guide curves 23 thereby moving upwardly through main portion 23''' to end portion 23'' of guide curve 23.

FIG. 5D shows panel 3 also in its upwardly moved venting position in which the front of panel 3 is kept down, while the rear of panel 3 is moved up so that panel 3 takes up a rearwardly and upwardly inclined position. Panel 3 has thus been rotated around a front axis and therefore guide legs 25 with guide pins 24 also have been slightly rotated during their upward movement. In order to allow guide pins 24 to rotate around a lateral axis with respect to their guide curves 23, the guide pins 24 are slightly barrel-shaped as is shown in FIG. 5D. The cross section of guide curves 23 could also be adapted to the barrel shape of guide pins 24, but this is not required if the rotation is limited.

FIG. 6A-6D show a second embodiment of the operating mechanism. This embodiment could lead to a greater lift height within the same package height, or to a similar lift height with a smaller package height. The main difference is that guide slots 19 are not horizontal and/or aligned but extend in an inclined direction in which the guide slots 19 of a pair extend parallel to each other outwardly and upwardly. This means that not only guide pin 24 is lifted during its travel through guide curve 23 when curve slide 21 moves outwardly away from motor 10, but also curve slide 21 itself moves upwardly when its sliding pins 20 move through inclined guide slots 19. As is shown in the figures, guide rails 16 and drive cables 15 run for a certain length parallel to adjacent guide slots 19 such that cable attachment 22 moves parallel to curve slide 21 and therefore cable attachment can still be immovably fixed to curve slide 21.

Figure 7A:
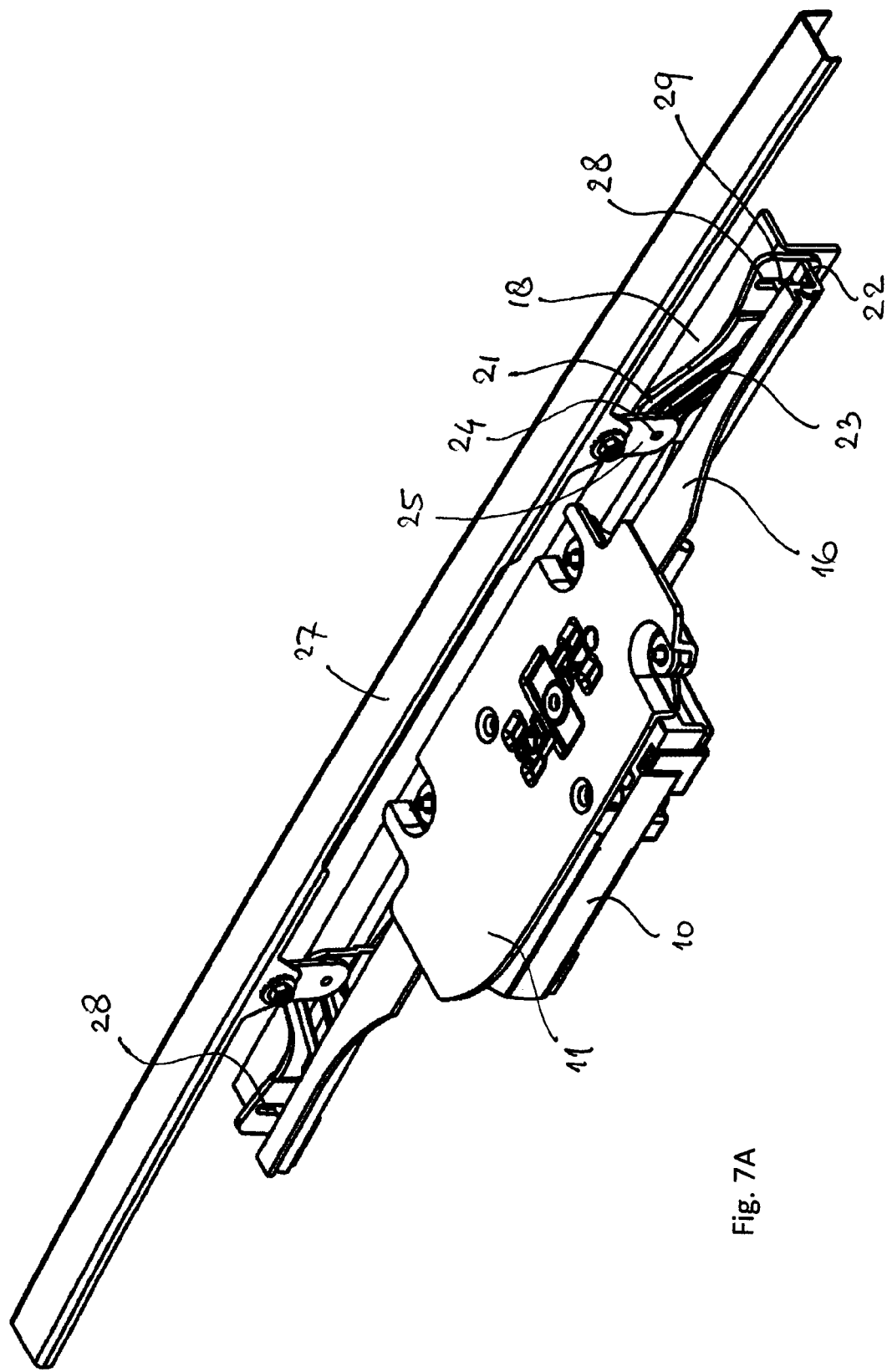
Figure 7D:
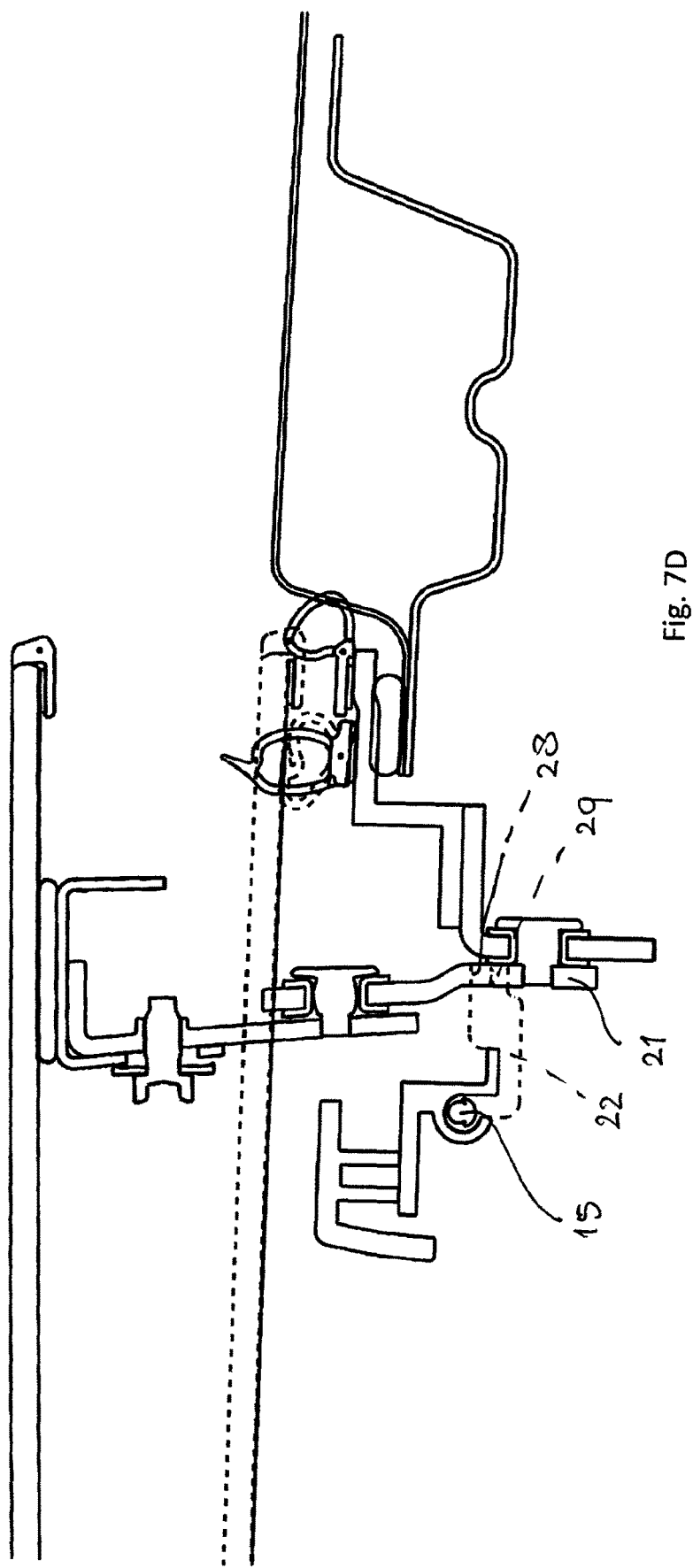
Figure 8A:
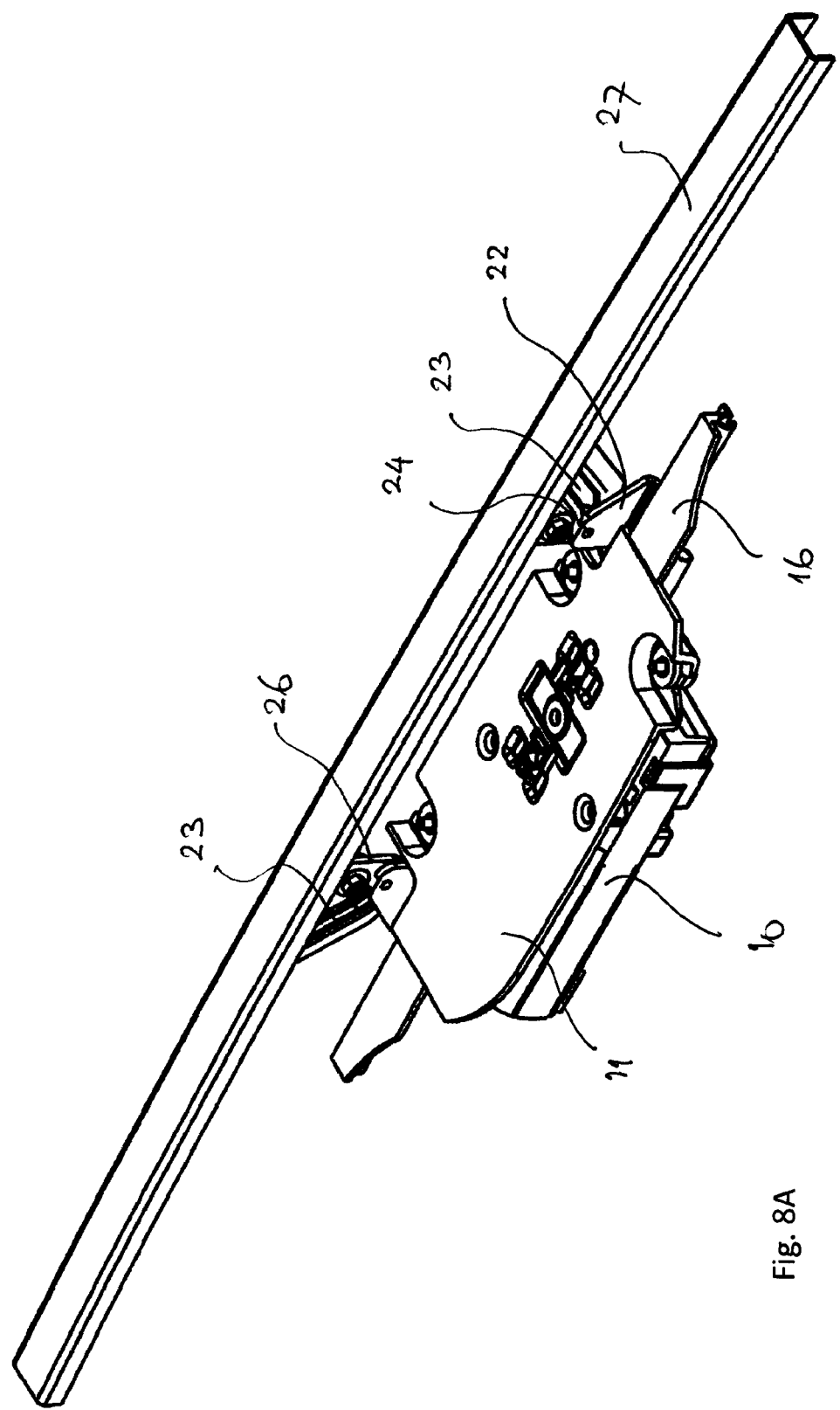
FIG. 8A is a view similar to that of FIG. 5A but showing still another embodiment of the motor and operating mechanism of the open roof construction.
Figure 8B:
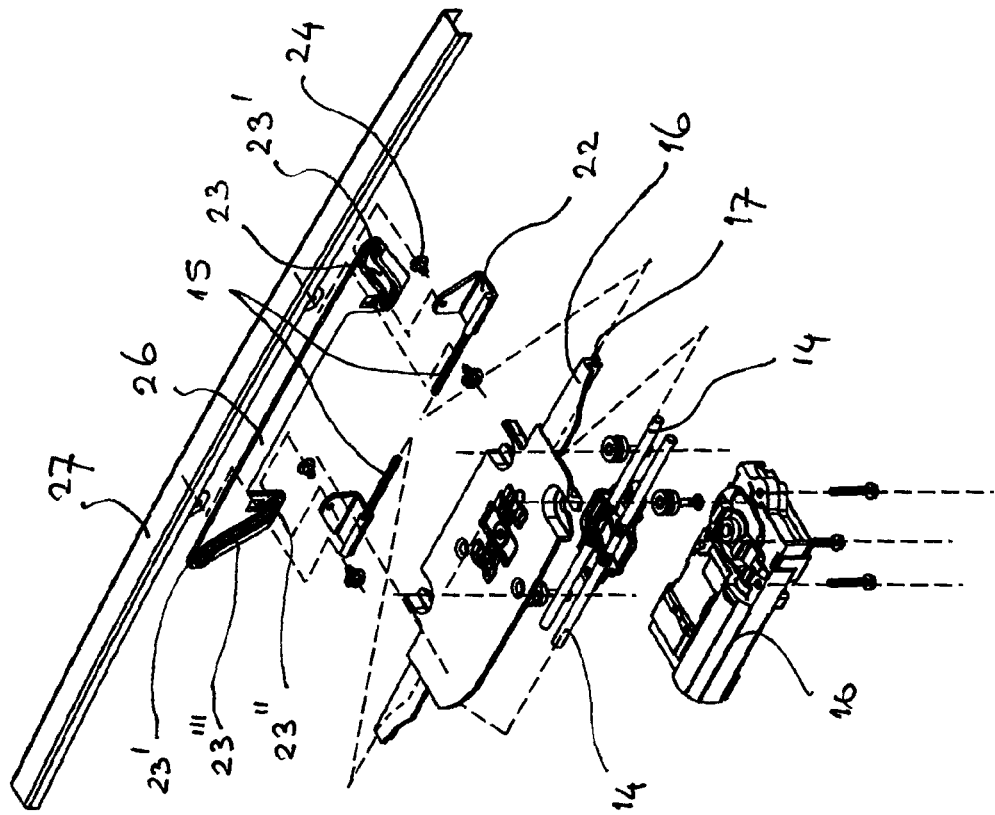
FIG. 8B is an exploded view corresponding to that of FIG. 4 but showing the embodiment of FIG. 8A.
Figure 8E:
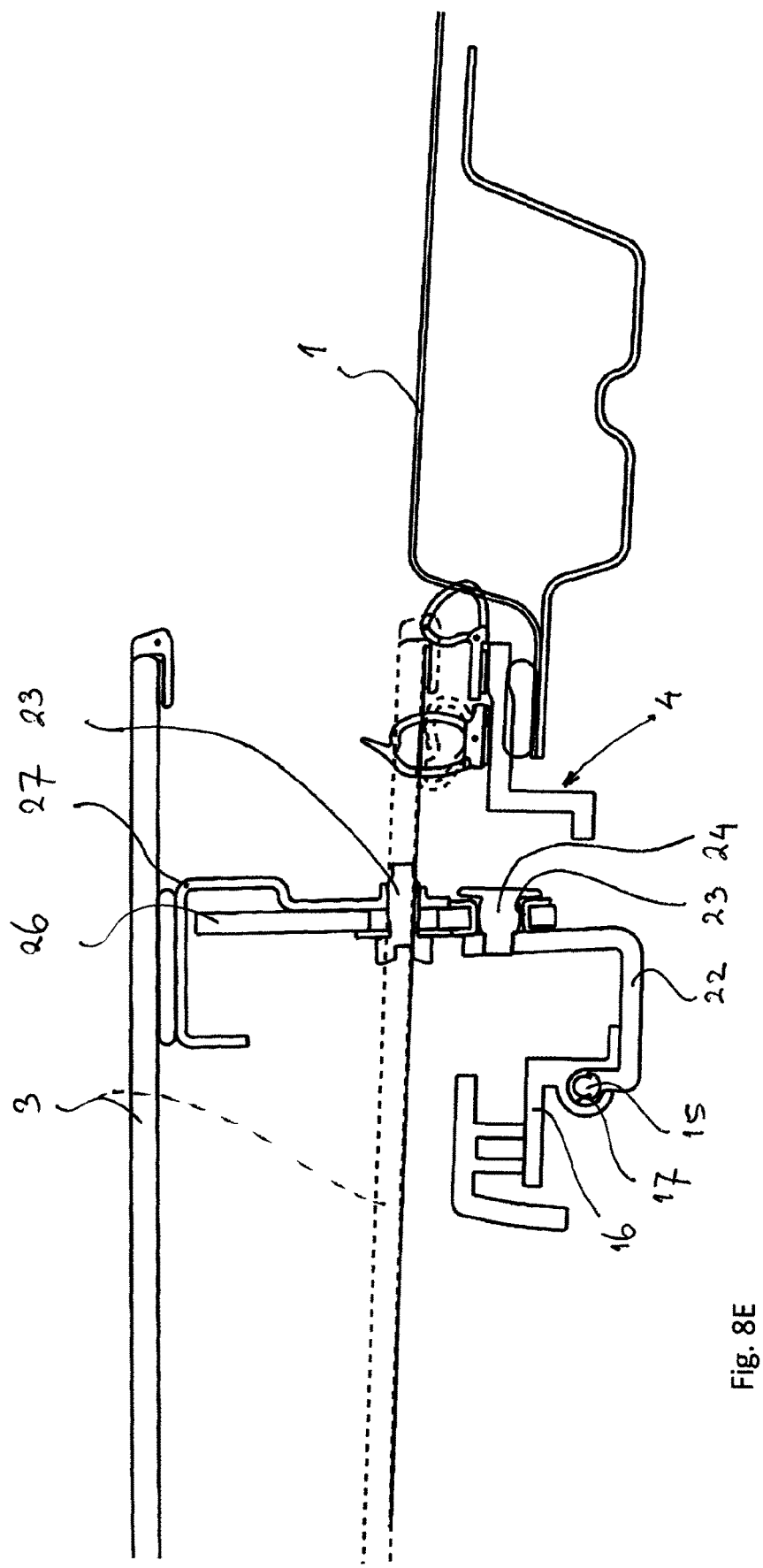

In the FIG. 7A-7C embodiment, guide rails 16 and drive cables 15 do not run parallel to guide slots 19 but remain substantially horizontal, i.e. substantially parallel to reinforcing member 27 and panel 3 above. As a result, the connection between cable attachment 22 and curve slide 21 must be height adjustable to compensate for the non-parallel movement between cable attachment 22 and curve slide 21. Here it is done through a pin-slot connection, including a vertical slot 28 in curve slide 21 and a pin 29 on cable attachment 22.

In the embodiment of FIG. 8A-8E the guide curves 23 and guide pins 24 have switched places. Guide pin 24 is now present on each cable attachment 22, while guide curves 23 are now present in bracket 26 (on reinforcing member 27) below panel 3. As guide pins 24 move outwardly away from motor 10 for opening panel 3, guide curves 23 now include an outwardly and upwardly inclined main portion 23''' between end portions 23' and 23''. End portion 23' of guide curve 23 in which guide pin 24 is situated when panel 3 is closed is now at the upper outer end of guide curve 23. In this embodiment the distance of the connection between the height-adjusting member (pin 24 on cable attachment 22) and the height-adjustable member (bracket 26 with guide curve 23) to the center $Y_0$ is slightly variable but still within the ranges mentioned above.

Figure 9A:
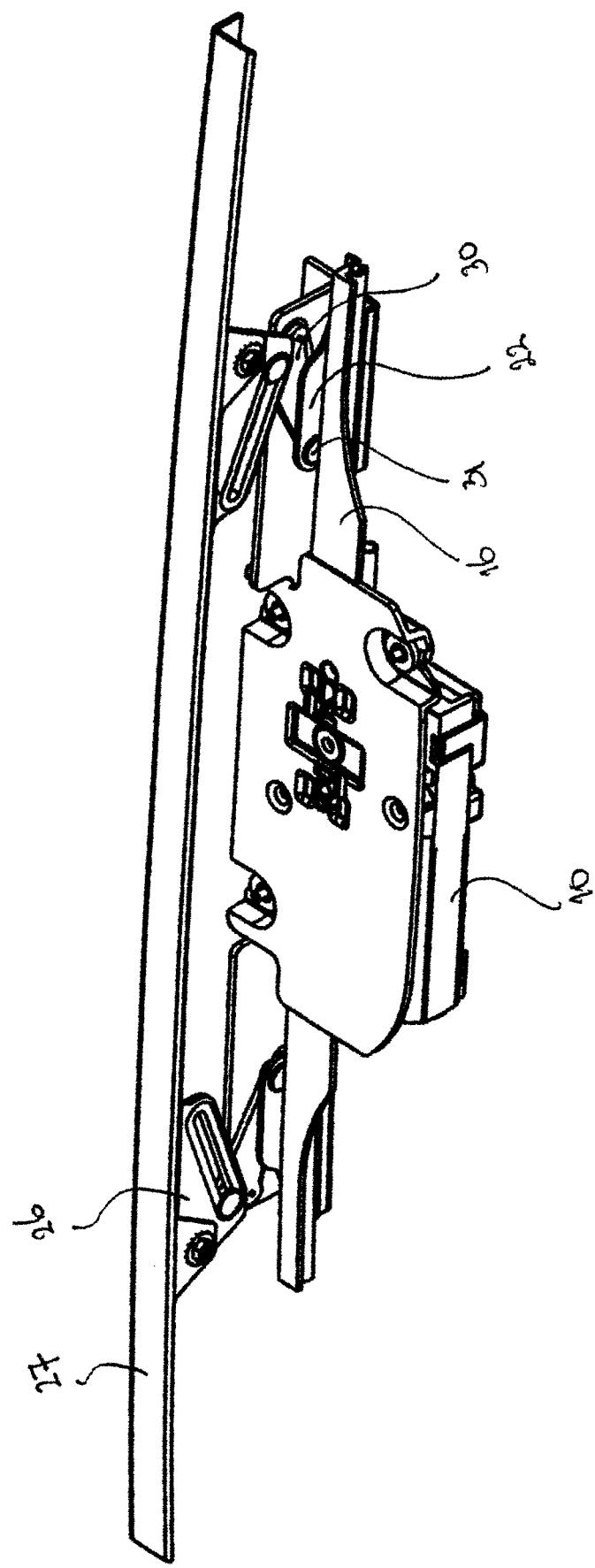
Figure 9B:
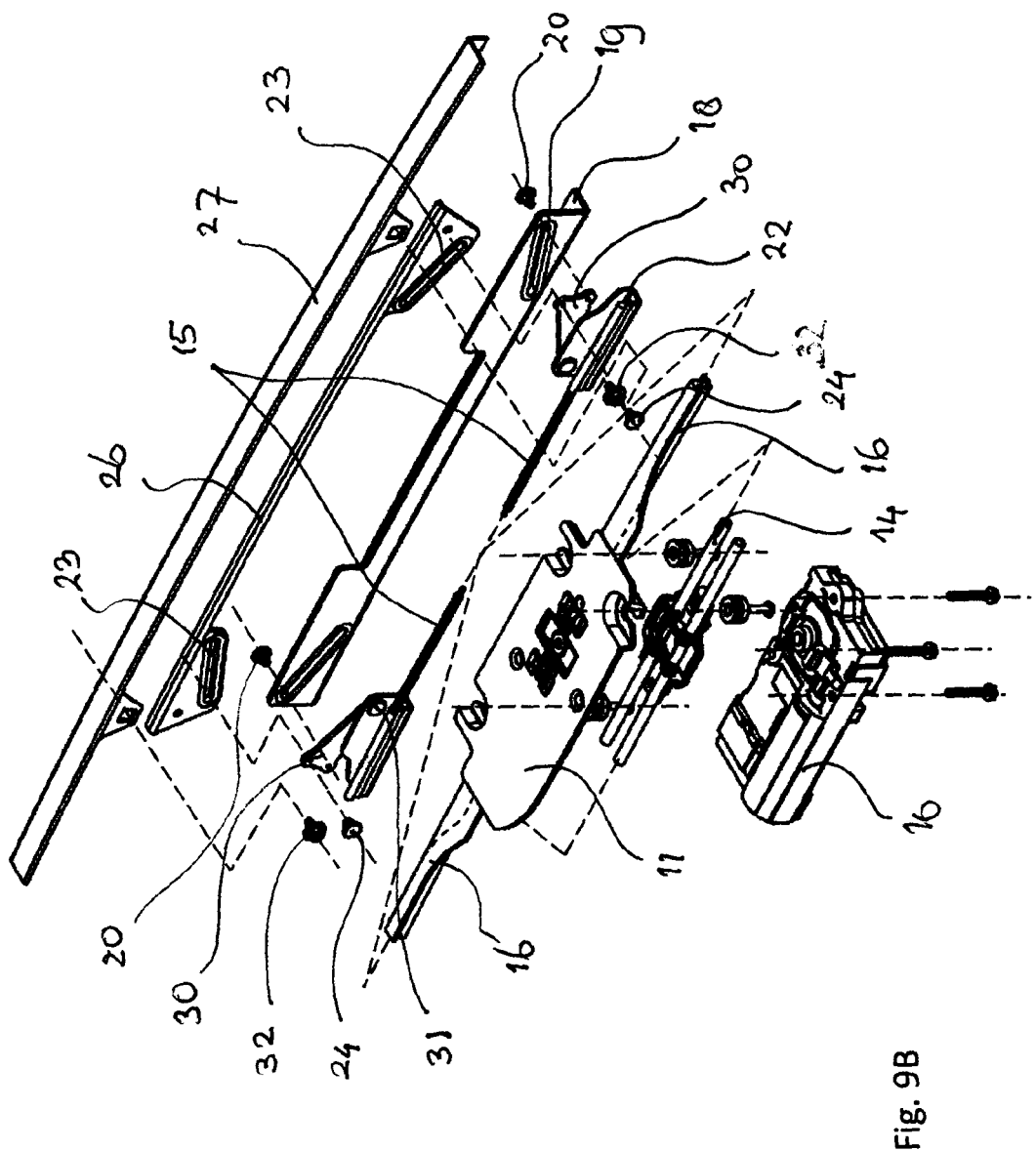

FIG. 9A-9F show a further revised embodiment of the operating mechanism for the open roof construction. This embodiment includes a lever 30, but this lever is supported in a very stable manner. As is shown in FIG. 9B, lever 30 is pivotally connected to cable attachment 22 through a pivot 31. Stationary guide rail 18 is now provided with a single guide slot 19 on each end, which is engaged by sliding pin 20 on a lower portion of a free end of lever 30. Guide pin 24 on an upper portion of the free end of lever 30, almost above sliding pin 20, is engaging guide curve 23 at each end of bracket 26 below panel 3. Thus, forces from panel 3 are almost directly transferred from guide pin 24 to sliding pin 20 without bending forces on lever 30.

Figure 9E:
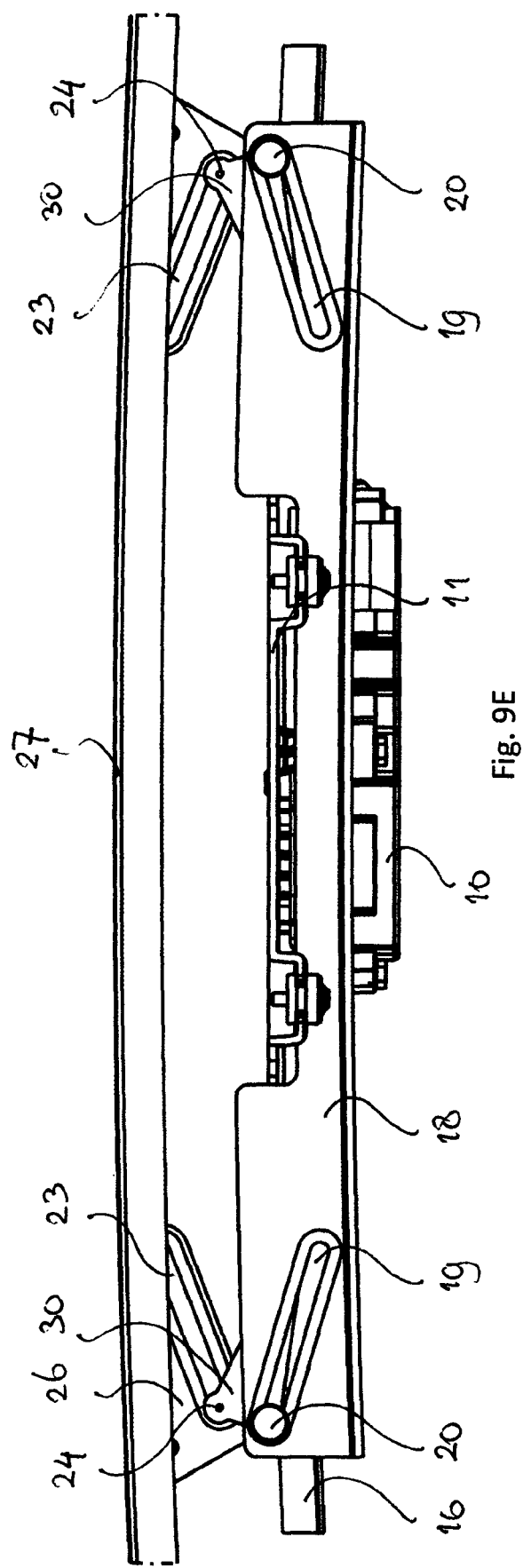
FIG. 9E is a rear view of the motor and operating mechanism of FIG. 9A in the position of FIG. 9D.
Figure 9F:
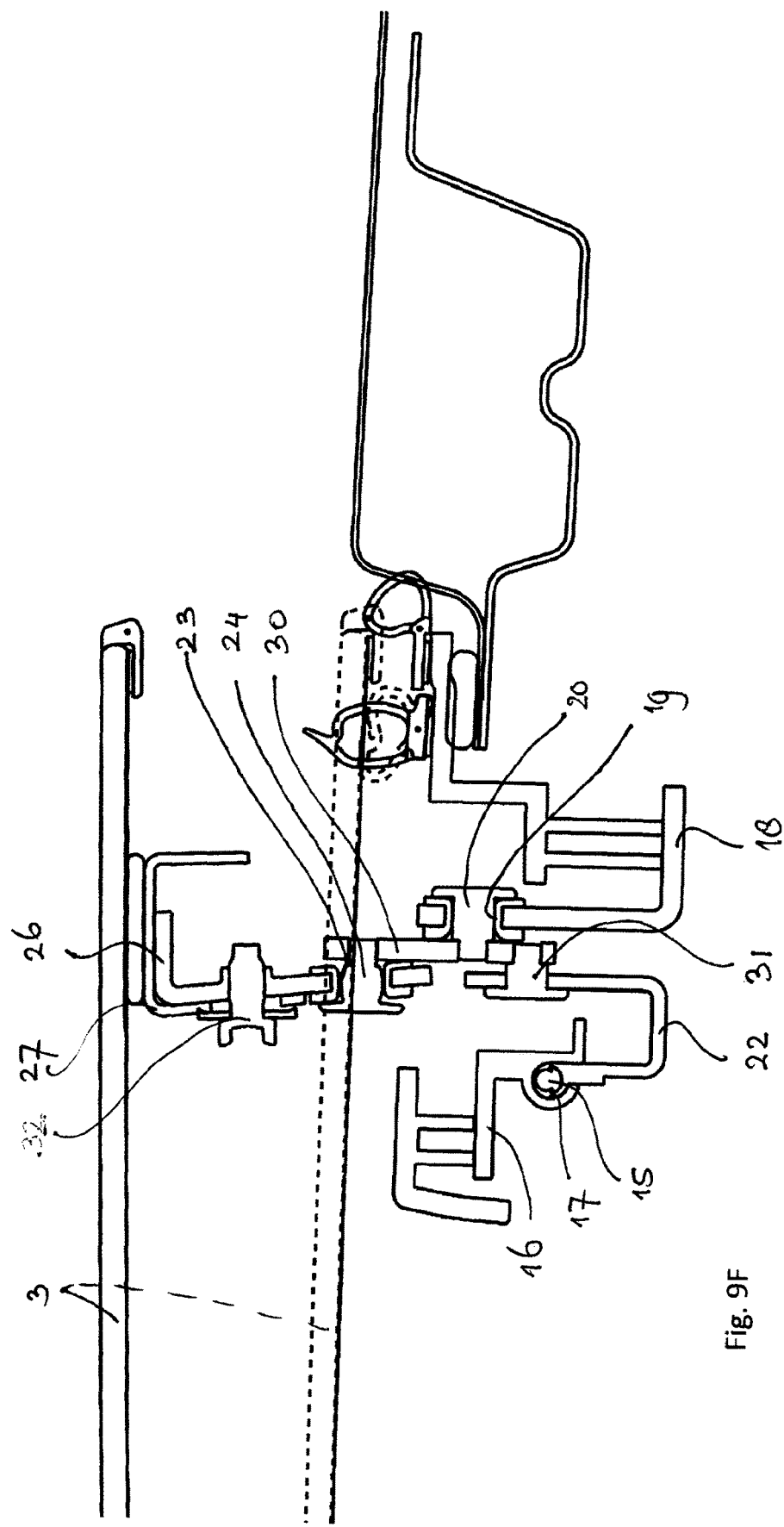
FIG. 9F is a view corresponding to that of FIG. 8E but showing the embodiment of FIG. 8A.

Fasteners 32 are used to attach bracket 26 to reinforcing member 27 below panel 3. FIGS. 9D and 9E show the operating mechanism from the front and rear side. FIG. 9F shows that guide pin 24 on lever 30 is barrel-shaped.

Thus, in this embodiment lever 30 is rotated as a result of the travel of its sliding pin 20 in inclined guide slot 19, while another height adjustment takes place due to the travel of guide pin 24 in inclined guide curve 23. The advantage of this embodiment is the relatively low resistance of the operating mechanism during operation and therefore low load on electric motor 10.

Figure 10A:
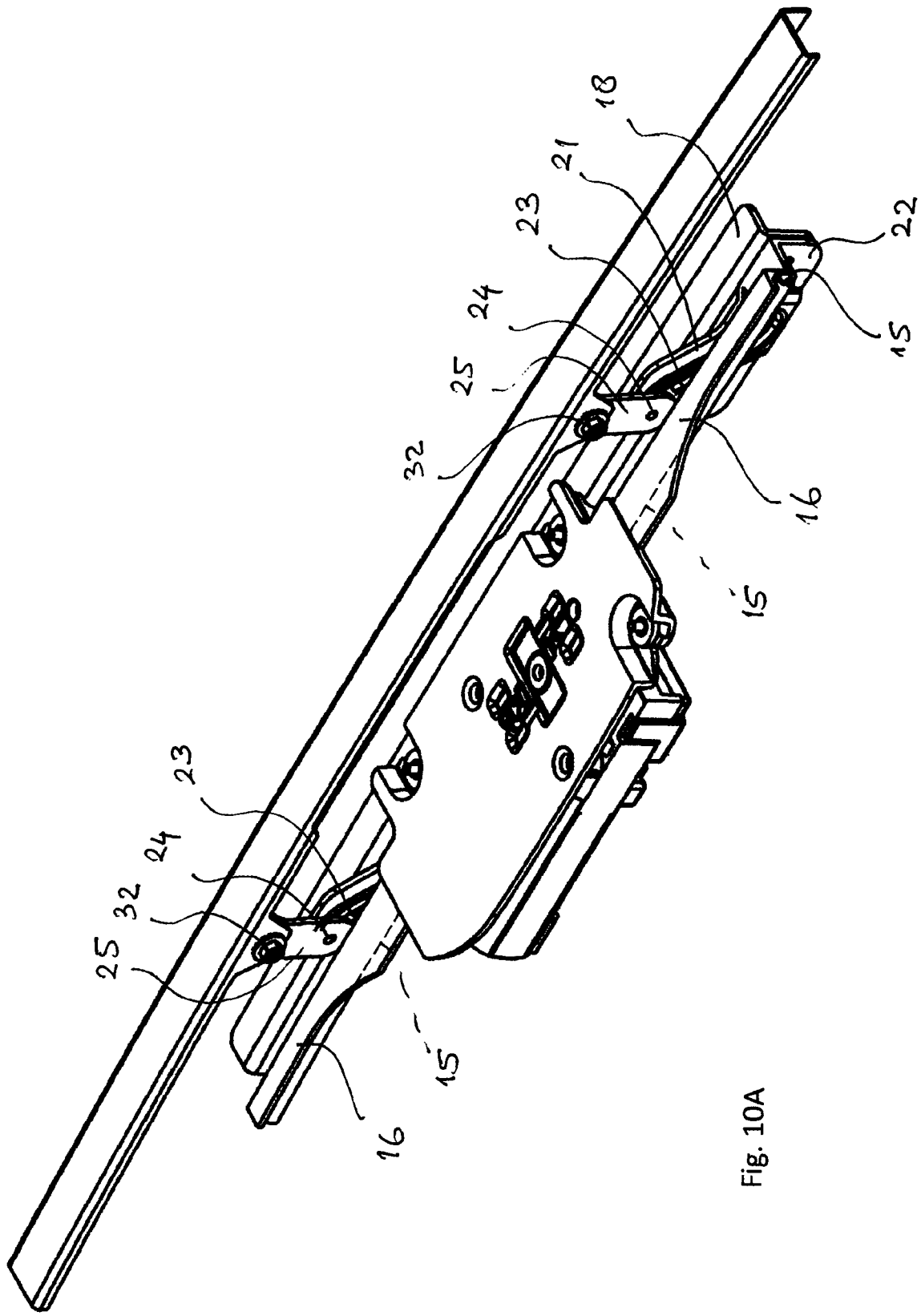
FIGS. 10A-10C are views corresponding to those of FIGS. 5A-5C but showing a last embodiment.
Figure 10B:
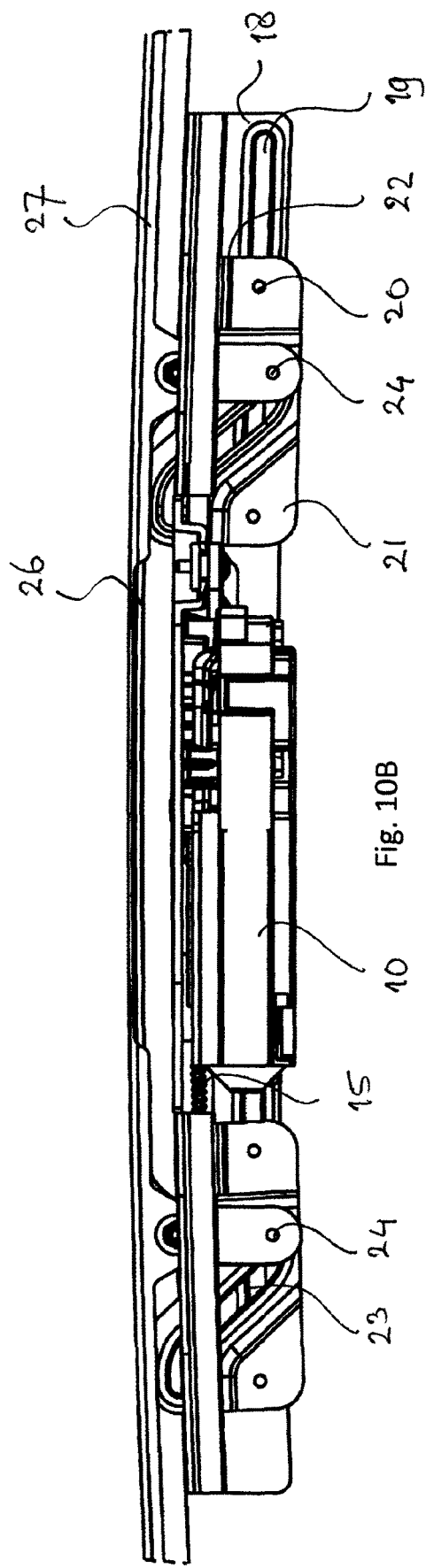
Figure 10C:
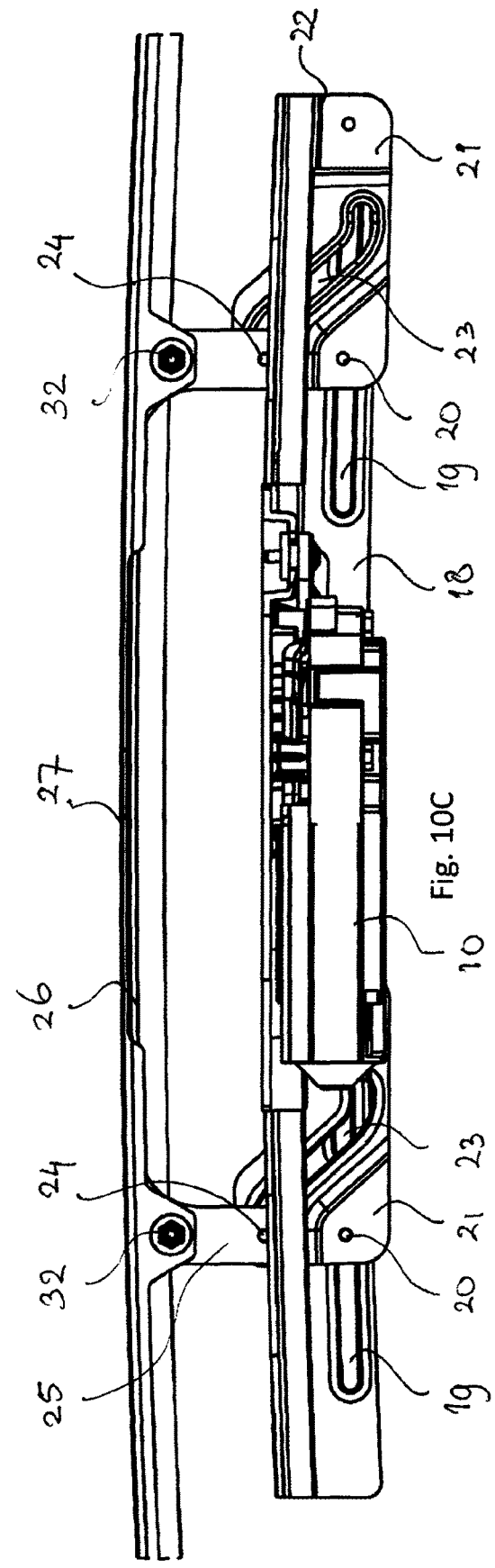

The difference of the last embodiment shown in FIGS. 10A-10C with the former embodiments is that it uses only one drive cable 15, so that cable attachments 22 are attached to the opposite ends of the same drive cable 15. As a consequence, cable attachments 22 do not move in opposite directions as in the other embodiments but in the same direction. Therefore the parts cooperating with the cable attachments 22 are not shaped in mirror image but are equally shaped as they should react to an equally directed movement of cable attachment 22 and curve slide 21 attached to it. The advantage of this embodiment is the fact that single drive cable 15 could be completely straight (as shown by the dotted lines 15 in FIG. 10A) and therefore the resistance of drive cable 15 and the resulting load on electric motor 10 is relatively low. The other embodiments have two drive cables 15 and at least one of those cables 15 should have an S-shaped portion in order to align the end parts thereof which are attached to the aligned cable attachments 22. This single cable embodiment can be used in other embodiments as well if the height-adjusting parts on either side of motor 10 are equally shaped as well and not mirror shaped.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. For example, drive cables may be replaced by other elongate drive members, especially in the case of a single drive cable, this may be replaced by a rigid drive element such as a rod, rack and pinion and the like. Such variations are not to be regarded as a departure from the spirit and scope of the invention, and all such modifications as would be apparent to one skilled in the art are intended to be included within the scope of the following claims.

What is claimed is:

1. An open roof construction for a vehicle having an opening in its fixed roof, comprising:
    a stationary frame configured to fit in the opening of the fixed roof;
    at least a panel movably supported by the frame and configured to at least partly open and close the opening in the fixed roof by tilting the panel with its rear edge up and down;
    a drive motor placed in the vicinity of the rear edge of the opening in the fixed roof and in the vicinity of a longitudinal center line of the opening, said drive motor being attached to the stationary frame, said drive motor comprising an output shaft and elongate drive members extending from the output shaft oppositely along the rear edge of the opening;
    an operating mechanism movably connected between the frame near the rear edge of the opening and the rear edge of the panel, the operating mechanism including two height-adjusting members on the frame, one on each lateral side of the drive motor and guided for a movement in a lateral direction initiated by the drive members; and
    two height-adjustable members immovably fixed to the panel and cooperating with a sloping guide curve in the height-adjusting members on the frame which move along with the drive members so as to cause the height adjustment.

2. The open roof construction according to claim 1, wherein the height-adjusting members on the frame are connected to the height-adjustable members on the panel at a distance from a respective side edge of the panel.

3. The open roof construction according to claim 1 wherein the height-adjusting members on the frame are connected to the height-adjustable members on the panel at a distance from a respective side edge of the panel such that the middle of the connection of each height-adjusting member to the height-adjustable member is at a distance from the longitudinal center line ($Y_0$) of the panel ranging from 10%-45% of the local width (W) of the panel.

4. The open roof construction according to claim 1, wherein the height-adjusting members and the height-adjustable members each include the guide curve and a guide pin engaging the guide curve, one thereof being fixed to the panel, the other being connected to the frame.

5. The open roof construction according to claim 4, wherein the panel is tiltable around a lateral axis near a front edge of the panel and wherein at least a portion of the guide pin engaging the guide curve is substantially barrel-shaped to enable a limited angular rotation between the guide pin and the guide curve around said lateral axis.

6. An open roof construction for a vehicle having an opening in its fixed roof, comprising:
    a stationary frame configured to fit in the opening of the fixed roof;
    at least a panel movably supported by the frame and configured to at least partly open and close the opening in the fixed roof by tilting the panel with its rear edge up and down;
    a drive motor placed in the vicinity of the rear edge of the opening in the fixed roof and in the vicinity of a longitudinal center line of the opening, said drive motor being attached to the stationary frame, said drive motor comprising a substantially vertical output shaft having a gear wheel and drive members in engagement with the gear wheel on said output shaft and extending from the output shaft oppositely along the rear edge of the opening;
    an operating mechanism movably connected between the frame near the rear edge of the opening and the rear edge of the panel, the operating mechanism including two height-adjusting members on the frame, one on each lateral side of the drive motor and guided for a movement in a lateral direction initiated by the drive members; and
    two height-adjustable members immovably fixed to the panel and cooperating with the height-adjusting members on the frame which move along with the drive members so as to cause the height adjustment.

7. The open roof construction according to claim 6, wherein the drive members are each a drive cable which are in engagement with the gear wheel on opposite sides thereof, the height-adjustable members and the height-adjusting members are each mutually mirror-shaped with respect to the longitudinal center line ($Y_0$), and the drive cables with the height-adjusting members move in opposite directions.

8. The open roof construction according to claim 6, wherein the drive members are opposite end portions of a single drive cable extending substantially in a straight line in a lateral direction of the roof, and wherein the height-adjustable members are equally shaped with respect to each other and the height-adjusting members are equally shaped with respect to each other and the height-adjusting members move in the same direction by said single drive cable.

9. The open roof construction according to claim 1, wherein the height-adjusting members are guided to move substantially in lateral direction only.

10. The open roof construction according to claim 1, wherein the height-adjusting members are guided to move at least partly along an inclined path in lateral and vertical directions.

11. The open roof construction according to claim 1, wherein the height-adjusting members are each provided with a guide curve and the height-adjustable members with a guide pin.

12. The open roof construction according to claim 1, wherein the height-adjusting members are each provided with a guide pin and the height-adjustable members with a guide curve.

13. The open roof construction according to claim 1, wherein the operating mechanism is configured such that the panel is only tiltable up and down.

14. An open roof construction for a vehicle having an opening in its fixed roof, comprising:
a stationary frame fitted in the opening of the fixed roof;
at least a panel movably supported by the frame and capable of at least partly opening and closing the opening in the fixed roof by tilting the panel with its rear edge up and down;
a drive motor placed in the vicinity of the rear edge of the opening in the fixed roof and in the vicinity of a longitudinal center line of the opening, said drive motor being attached to the stationary frame, said drive motor comprising an output shaft and elongate drive members extending from the output shaft oppositely along the rear edge of the opening;
an operating mechanism movably connected between the frame near the rear edge of the opening and the rear edge of the panel, the operating mechanism including two height-adjusting members on the frame, one on each lateral side of the drive motor and guided for a movement in lateral direction initiated by the drive members, and two height-adjustable members immovably fixed to the panel and cooperating with the height-adjusting members on the frame so as to cause the height adjustment; and
wherein the height-adjusting members on the frame engage with a sloping guide curve in the height-adjustable members on the panel at a distance from a respective side edge of the panel, such that a middle of the connection of each height-adjusting member to the height-adjustable member is at a distance from the longitudinal center line (Y0) of the panel ranging from about 10% to about 45% of the local width (W) of the panel.

15. The open roof construction according to claim 14, wherein the height-adjusting members and the height-adjustable members each include a guide curve and a guide pin engaging the guide curve, one thereof being fixed to the panel, the other being connected to the frame.

16. The open roof construction according to claim 15, wherein the panel is tiltable around a lateral axis near a front edge of the panel and wherein at least a portion of the guide pin engaging the guide curve is substantially barrel-shaped to enable a limited angular rotation between the guide pin and the guide curve around said lateral axis.

17. A vehicle comprising:
a fixed roof having an opening;
a roof assembly comprising:
a stationary frame secured to the fixed roof;
at least a panel movably supported by the frame and configured to at least partly open and close the opening in the fixed roof by tilting the panel with its rear edge up and down;
a drive motor placed in the vicinity of the rear edge of the opening in the fixed roof and in the vicinity of a longitudinal center line of the opening, said drive motor being attached to the stationary frame, said drive motor comprising a substantially vertical output shaft having a gear wheel and elongate drive members in engagement with the gear wheel on said output shaft and extending from the output shaft oppositely along the rear edge of the opening;
an operating mechanism movably connected between the frame near the rear edge of the opening and the rear edge of the panel, the operating mechanism including two height-adjusting members on the frame, one on each lateral side of the drive motor and guided for a movement in a lateral direction initiated by the drive members; and
two height-adjustable members immovably fixed to the panel and cooperating with with a sloping guide curve in the height-adjusting members on the frame which move along with the drive members so as to cause the height adjustment.

18. The vehicle according to claim 17, wherein the height-adjusting members on the frame are connected to the height-adjustable members on the panel at a distance from a respective side edge of the panel such that the middle of the connection of each height-adjusting member to the height-adjustable member is at a distance from the longitudinal center line ($Y_0$) of the panel ranging from 10%-45% of the local width (W) of the panel.

* * * * *